(12) United States Patent  (10) Patent No.: US 8,453,064 B2
Machino et al.  (45) Date of Patent: *May 28, 2013

(54) DISPLAY-INTEGRATED IMAGE FORMING APPARATUS

(75) Inventors: Satoshi Machino, Kyoto (JP); Yasuhiro Nakai, Kyoto (JP); Kenzoh Yoshida, Nara (JP); Masanori Matsumoto, Nara (JP); Tsutomu Yoshimoto, Nara (JP); Takeshi Nakamura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 403 days.

This patent is subject to a terminal disclaimer.

(21) Appl. No.: 12/395,068

(22) Filed: Feb. 27, 2009

(65) Prior Publication Data

US 2009/0222745 A1 Sep. 3, 2009

(30) Foreign Application Priority Data

Feb. 28, 2008 (JP) .................................. 2008-048515

(51) Int. Cl.
G06F 3/00 (2006.01)
(52) U.S. Cl.
USPC ............................. 715/761; 715/703; 345/1.1
(58) Field of Classification Search
USPC ............................ 715/778, 703, 761; 345/1.1
See application file for complete search history.

(56) References Cited

U.S. PATENT DOCUMENTS

| | | | |
|---|---|---|---|
| 2002/0165768 A1 | 11/2002 | Haraguchi et al. | |
| 2004/0061999 A1* | 4/2004 | Takemoto et al. | 361/683 |
| 2005/0108367 A1* | 5/2005 | Penke et al. | 709/220 |
| 2006/0101344 A1* | 5/2006 | Tabata | 715/761 |
| 2006/0282398 A1* | 12/2006 | Mueller et al. | 705/400 |
| 2007/0094598 A1* | 4/2007 | Nakai et al. | 715/703 |
| 2008/0024388 A1* | 1/2008 | Bruce | 345/1.1 |
| 2008/0189172 A1* | 8/2008 | Goren et al. | 705/14 |
| 2009/0102744 A1* | 4/2009 | Ram | 345/1.1 |

FOREIGN PATENT DOCUMENTS

| | | |
|---|---|---|
| EP | 1071282 A2 | 1/2001 |
| JP | 64-032125 | 2/1989 |
| JP | 2001-306928 | 11/2001 |
| JP | 2002-156873 A | 5/2002 |
| JP | 2002-329139 A | 11/2002 |
| JP | 2005-274811 A | 10/2005 |

* cited by examiner

Primary Examiner — Jordany Nunez
Assistant Examiner — Tuan S Nguyen
(74) Attorney, Agent, or Firm — Birch, Stewart, Kolasch & Birch, LLP

(57) ABSTRACT

An image forming apparatus is provided with an original capturing portion, a print portion, an operation portion, a management portion that manages various provided information, and a control portion that controls the original capturing portion, the print portion, the operation portion, and the management portion. A display apparatus that has a display screen visible from a back face or a side face of the image forming apparatus is disposed on at least one side face of an image forming apparatus case, and the control portion displays various provided information managed by the management portion on the display screen.

15 Claims, 18 Drawing Sheets

DISPLAY-INTEGRATED IMAGE FORMING APPARATUS

CROSS-REFERENCE TO RELATED APPLICATION

This application claims priority under 35 U.S.C. §119(a) on Japanese Patent Application No. 2008-048515 filed in Japan on Feb. 28, 2008, the entire contents of which are herein incorporated by reference.

BACKGROUND OF THE INVENTION

1. Field of the Invention

The present invention relates to an image forming apparatus such as a multifunction peripheral or digital copier, and more specifically relates to a display-integrated image forming apparatus in which a large-format display apparatus is integrated with an image forming apparatus.

2. Description of the Related Art

Recently, many image forming apparatuses such as multifunction peripherals and digital copiers are being installed in mass retail stores or the like such as convenience stores and supermarkets, and such image forming apparatuses are mainly used, for example, when a user that uses the store takes a copy of an original.

Incidentally, in recent convenience stores, the portion of the store that faces the street (walkway) is entirely encased in glass, and products are displayed such that people walking along the walkway can know the state of products inside the store at a glance. For example, as shown in FIG. 18, in an ordinary arrangement pattern, a wide space-side glass window 501 and a narrow space-side glass window 502 are provided with an entrance 500 between them, a bookshelf 510 is placed along the wide space-side glass window 501, an image forming apparatus A is placed along the narrow space-side glass window 502, and an unshown register counter is disposed behind the image forming apparatus A within the store. In such an arrangement configuration, conventionally, paper advertisements 505 such as posters are directly applied, facing outside of the store, to the walkway-side glass windows 501 and 502, so that various publicity activity to pedestrians is carried out. Also, publicity activity to customers inside of the store is carried out by posting paper advertisements in a slight amount of open space of a display shelf within the store.

With this sort of publicity activity, it is difficult to frequently change advertisements, so there is the problem that detailed publicity activity cannot be performed in which, for example, advertising targeted to businessmen is carried out during a time span in which many businessmen pass by, and advertising targeted to housewives or students is carried out during a time span in the daytime in which there are many housewives or students.

Also, the technique in which the walkway-side of the store is entirely encased in glass and advertisements are posted on that glass face is also adopted by real estate companies and the like, so that various real estate advertisements are posted all over the glass face wall and thus provided to passers-by. However, in this case as well, it is necessary for employees to manually remove information of real estate that is under a rental contract or purchase contract, and post new real estate information or the like, so there is the problem that removal, posting, or the like is frequently forgotten, and therefore the provided information may not be the newest information.

On the other hand, with the present state of technology, as described above, the image forming apparatus placed in each store is mainly used only when a user of the store takes a copy of an original, and is rarely used for other purposes. Consequently, there have been proposals for a way of improving the usage efficiency of such image forming apparatuses (for example, see JP 2002-329139A and JP 2002-156873A).

JP 2002-329139A describes an advertisement information processing system in which a wall face display and a printer are connected to each other and placed in a store, and when a print button that corresponds to advertisement information that has been displayed in the wall face display is pressed, it is possible to print the advertisement information for which that print button was pressed with the printer.

Also, JP 2002-156873A describes an image processing apparatus in which an image processing apparatus that is a copy machine and a cash register are connected by a LAN, and when capturing a poster image original that has been placed on a platen of the copier, the poster image is displayed in an operation screen of the copier, and is displayed in a display apparatus of the cash register via the LAN.

As described above, there have been proposals to increase advertising publicity functionality using an image forming apparatus, by connecting the image forming apparatus to a display apparatus, and printing advertising information displayed in the display apparatus with the image forming apparatus, or displaying a poster image that has been captured with the image forming apparatus in an operation screen of the image forming apparatus or on a display apparatus of a cash register.

However, with the technology described in JP 2002-329139A, it is necessary to install a display along the entire walkway-side wall face, and connect this display to a printer installed within the store with a communications cable, so much installation work is needed, and installation in each store is necessary, so there is the problem that installation work is very complicated. Also, there is the problem that after installation is performed once, it is not possible to simply change the layout according to circumstances.

Further, in the technology described in JP 2002-156873A, although advertising information can be displayed in an operation screen of an image forming apparatus or a display screen of a cash register, this is a publicity advertisement to customers inside the store, and not a publicity advertisement to people walking along the walkway in front of the store. Also, there is the problem that by only displaying advertising information on an operation screen of an image forming apparatus or a display screen of a cash register, even most customers inside the store do not notice the advertising information, and thus an adequate publicity effect is not obtained.

Additionally, the image forming apparatus and a large screen (for example, such as 50 inches) display apparatus connected by a cable are installed in stores, but in a store such as a convenience store or a supermarket, the question of how much selling area to secure is an issue, and because placement of two large devices in this manner results in a reduction in selling area, this approach has not been widely adopted. Also, with the present state of technology, it may not be possible to secure an installation location in a small store, and so the system is not necessarily advantageous to the store. For example, the outer dimensions of a 52V-inch liquid crystal display (Sharp PN-525) are height 1254 mm, width 742 mm, and depth 92 mm, and weight 44 Kg, the outer dimensions of a liquid crystal display stand (Sharp ID-DS03W) are width 917 mm, depth 870 mm, and the outer dimensions of a digital multifunction peripheral (Sharp MX-3500FN) are height 950 mm, width 645 mm, and depth 670 mm, and weight 120 Kg. Here, when the liquid crystal display and the digital copier are placed in series, the necessary occupied floor area is the width: liquid crystal display stand width 917 mm times the depth: 1540 mm (digital copier depth 670 mm+liquid crystal display stand depth 870 mm).

SUMMARY OF THE INVENTION

The present invention was made in order to address the problems described above, and it is an object thereof to provide a display-integrated image forming apparatus with which it is possible to obtain an adequate publicity effect to walkway pedestrians, and also for the store, possible to provide effective and detailed information in real time, without requiring a large installation location and with very simple installation work.

In order to address the above problems, the display-integrated image forming apparatus of the present invention includes an original capturing portion, a print portion, an operation portion, a management portion that manages various provided information, and a control portion that controls the original capturing portion, the print portion, the operation portion, and the management portion, a display apparatus that has a display screen (hereinafter, also referred to as a 'first display screen') visible from a back face or a side face of the image forming apparatus being disposed on at least one side face of an image forming apparatus case, and the control portion displaying various provided information managed by the management portion on the display screen. That is, by using an image forming apparatus also as a leg portion of a display apparatus, it is possible to fit two large devices, namely the image forming apparatus and the display apparatus, substantially within the installation space of the image forming apparatus. Incidentally, if the above 52V-inch liquid crystal display (Sharp PN-525) is mounted to the rear face of the above digital multifunction peripheral (Sharp MX-3500FN), the necessary occupied floor area is only the width: liquid crystal display width 742 mm times the depth: 762 mm (liquid crystal display depth 92 mm+digital multifunction peripheral depth 670 mm). Also, balance is poor if the liquid crystal display is placed vertically, but by integrating the liquid crystal display with the digital multifunction peripheral, stable installation with good weight balance of the digital multifunction peripheral and the liquid crystal display is possible. Thus, even in a small store such as a convenience store or a supermarket, installation is possible in about the same location as conventional installation of an image forming apparatus. In this case, when the display apparatus is attached to, for example, the rear face of the image forming apparatus such that the first display screen faces outside, by only installing the image forming apparatus inside the store in the conventional manner, the first display screen of the display apparatus faces pedestrians outside of the store through the street-side (i.e., the walkway-side) wall face glass. Accordingly, by displaying various provided information (such as advertising information) managed by the management portion on the first display screen, it is possible to display publicity advertisements with impact to pedestrians outside of the store, and thus it is possible to make the pedestrians interested in products and aware of information.

Also, according to the present invention, the display apparatus is disposed such that the top of the display apparatus protrudes above the image forming apparatus case, and a second display screen is disposed on a face of that protruding portion that is opposite to the first display screen. Also, the control portion displays various provided information managed by the management portion on the first display screen, and displays related information that is related to the provided information displayed in the first display screen on the second display screen. Alternatively, a configuration may be adopted in which the control portion displays information on the second display screen that is not related to the first display screen.

That is, when the first display screen and the second display screen are displaying related information, print output of the display content of the first display screen on the rear face of the image forming apparatus can be performed while confirming that display content on the second display screen on the front face of the image forming apparatus.

Also, a configuration may be adopted in which advertising information is displayed in the first display screen, and operation instructions, advertising information that differs from the first display screen, or the like is displayed in the second display screen. When operation instructions are displayed in the second display screen, the person that performs a print output operation can more easily perform that operation. Also, by displaying other advertising information, when the content wished to be shown inside of the store and outside of the store differs, different information may be displayed in the first display screen and the second display screen.

Also, according to the present invention, by providing a touch panel or the like on the second display screen, the second display screen can be used as a second operation portion. Thus, it becomes possible to perform various operations using either one or both of a first operation portion provided in the image forming apparatus and a second operation portion provided in the second display screen of the display apparatus, and an operator can select the more easily operated means. In this case, the second operation portion has a larger operation screen than the first operation portion, and therefore is an operation screen more easily viewed by the operator.

Also, according to the present invention, a configuration may be adopted in which when desired information is selected via the first operation portion from information displayed in the display apparatus by a user who has confirmed the display content of the display apparatus, the control portion performs print output of that selected information with the print portion. Alternatively, a configuration may be adopted in which when desired information is selected via the first operation portion or the second operation portion from information displayed in the second display screen by a user who has confirmed the display content of the first display screen of the display apparatus, the control portion performs print output of that selected information with the print portion.

Here, examples of selected information include information that is profitable both to the store and to customers, such as flyers of discount goods or the like, recipes for meals, sweets, or the like, coupons, tickets, and the like. By allowing immediate print output of information displayed in the first display screen, information related thereto, and the like from the image forming apparatus installed inside the store in this way, a pedestrian interested in the advertising content of the first display screen will enter the store in order to perform print output of that information. Thus, because it is possible to induce a pedestrian to enter the store who, with the conventional technology, passed by the store after only viewing an advertisement, an effect of attracting customers can be anticipated.

Also, according to the present invention, a configuration may be adopted in which the control portion displays, on the first display screen and/or the second display screen of the display apparatus, image information of an original that has been captured with the original capturing portion. Thus, in each store, it is possible to distribute real time information on a large screen. Also, when providing a time-limited service such as a sudden price reduction, it is possible to distribute an advertisement of the sudden price reduction in a timely manner, appropriate for the time span of that service.

Also, according to the present invention, a configuration may be adopted in which the management portion is provided with a communications portion for acquiring, via a communications network, provided information that is displayed in the first display screen and/or the second display screen.

The provided information displayed in a display screen, basically, is saved in a memory portion within the image forming apparatus, and whenever needed is read from the memory portion and displayed in the display apparatus by the management portion. By providing a communications portion, it is possible, for example, to acquire not only advertising information, but also regional information or the like via a communications network, and display that information on the first display screen of the display apparatus. Thus, it is possible to use the display apparatus as a bidirectional device.

Also, according to the present invention, the display apparatus is provided so as to be rotatable along one side face where the image forming apparatus case is attached, and the control portion is configured to switch the display direction of the display screen according to the rotation angle of the display apparatus. Depending on the store in which the display apparatus is installed, it may be desired to install a large-format display apparatus in a horizontal orientation instead of a vertical orientation. Accordingly, by making the display apparatus rotatable along one side face where the image forming apparatus case is attached, it is possible to adopt various modes of installation according to store circumstances. Also, when the display apparatus has been, for example, changed from vertical placement to horizontal placement, the control portion switches the display direction of the display screen from the vertical direction to the horizontal direction according to the rotation angle of the display apparatus, so the placement of the display apparatus can be changed without concern for the installation direction.

According to the present invention, by only installing the image forming apparatus inside the store in the conventional manner, the first display screen of the display apparatus faces pedestrians outside of the store through the street-side (i.e., the walkway-side) wall face glass, so by displaying various provided information (such as advertising information) managed by the management portion on the first display screen, it is possible to display publicity advertisements with impact to pedestrians outside of the store, and thus it is possible to make the pedestrians interested in products and aware of information.

DETAILED DESCRIPTION OF THE INVENTION

Hereinafter, embodiments of the present invention will be described with reference to the accompanying drawings.
—Overall Structure of Display-Integrated Image Forming Apparatus of Present Invention—

Figure 1A:
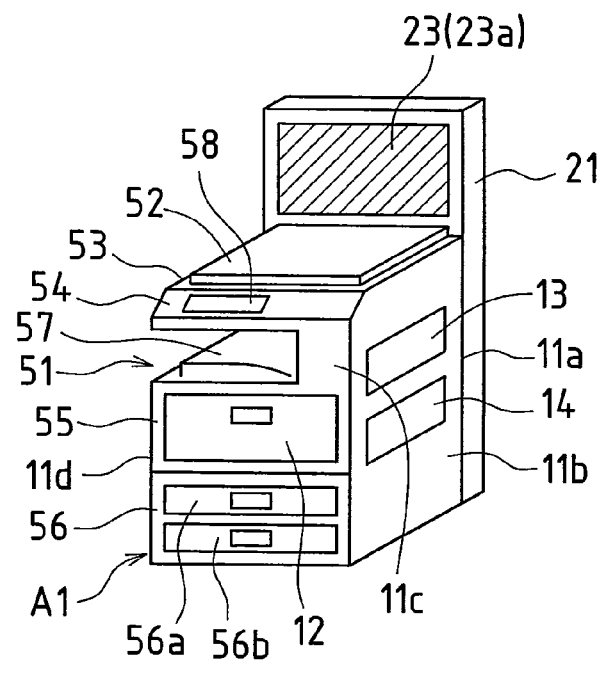
FIGS. 1A to 1C are outer perspective views of an embodiment of a display-integrated image forming apparatus of the present invention.
Figure 1B:
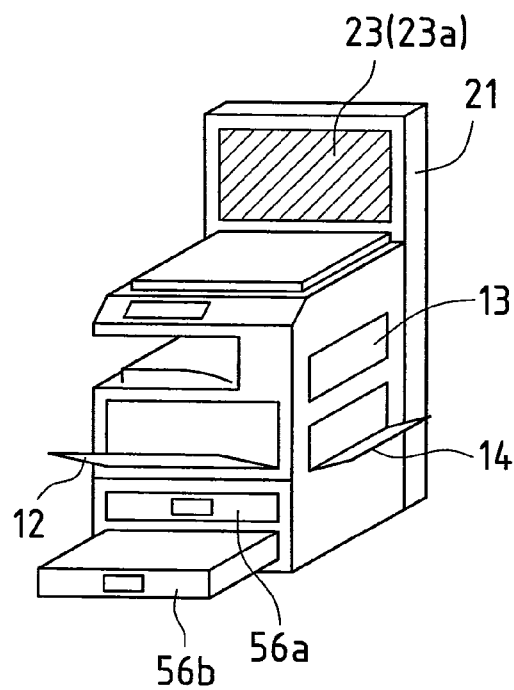
Figure 1C:
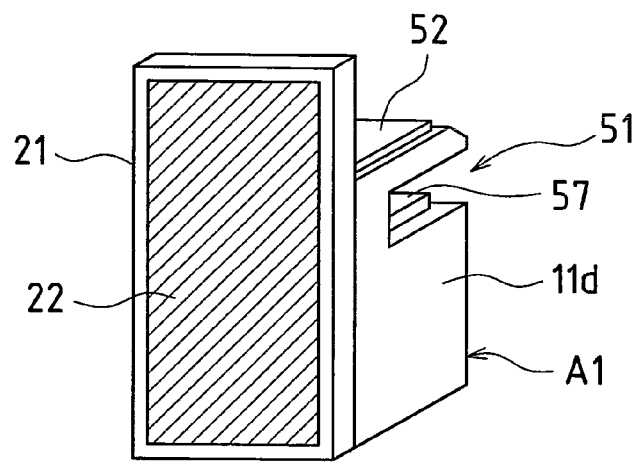

FIGS. 1A to 1C are outer perspective views of an embodiment of a display-integrated image forming apparatus of the present invention.

This image forming apparatus A1 is an image forming apparatus with an in-body paper discharge structure formed in a sideways U shape when viewed from the front. In the image forming apparatus A1, an original pressing lid 52, an original capturing portion 53, and a scanner portion 54 are disposed above an in-body paper discharge opening portion 51, and an image forming portion 55 and a paper supply portion 56 are disposed below the in-body paper discharge opening portion 51. Also, a keyboard-type and touch panel-type operation portion 58 is disposed on the front face of the original capturing portion 53.

That is, the image forming apparatus A1 is surrounded by a rear face case 11a formed in a rectangular shape, a right side face case 11b, an approximately rectangular front face case 11c where the in-body paper discharge opening portion 51 is notched in a sideways U shape, and a left side face case 11d, and the top of these case portions is covered by the scanner portion 54, which includes the original pressing lid 52 and the original capturing portion 53. Also, although not shown, casters are provided at each case bottom corner, so that the image forming apparatus can be freely moved by pushing.

The image forming apparatus A1 is a front access-type image forming apparatus in which, when an original is placed in the original capturing portion 53, when recording paper is drawn from a discharge tray 57 of the in-body paper discharge opening portion 51, and when recording paper is replenished in the paper supply portion 56, these activities can be performed from the front face of the image forming apparatus. Also, a front door 12 is provided immediately below the in-body paper discharge opening portion 51 of the front face case 11c, side doors 13 and 14 are provided at two locations above and below in the right side face case 11b, and respective paper cassettes 56a and 56b of the paper supply portion 56 are disposed so as to be capable of being pulled out to the front, below the front door 12. By opening the front door 12, it is possible to perform maintenance such as toner replenishment, exchanging of a photosensitive body, and repair or exchange of a fixing unit or a charging unit. Also, when removing jammed recording paper from a paper transport path, the side doors 13 and 14 are opened as necessary. However, other than disposing the discharge tray 57 in the in-body paper discharge opening portion 51, the configuration of constituent portions disposed above and below the in-body paper discharge opening portion 51 is an example, and is not limited to this arrangement configuration.

In the above configuration, in the present embodiment, a large-format display apparatus (display) 21, arranged so that the lengthwise direction of its screen is oriented vertically, is attached as a single body to the rear face case 11a of the image forming apparatus A1, with a first display screen 22 facing to the outside. That is, in the present embodiment, the image forming apparatus A1 is used as a leg portion of the large-format display 21. Thus, it is possible to fit two large devices, namely the image forming apparatus A1 and the large-format display 21, substantially within the installation space of the image forming apparatus A1. Also, because a connection cord between the image forming apparatus A1 and the large-format display 21 is not exposed to the outside, appearance is neat, and there is no problem of the connection cord being pulled. However, strictly speaking, a space is necessary for the thickness of the large-format display 21 and the depth of a vertical movement mechanism portion and a rotation mechanism portion, described below. Thus, even in a small store such as a convenience store or a supermarket, installation of the display-integrated image forming apparatus of the present invention is possible in about the same location as conventional installation of an image forming apparatus.

Also, the large-format display 21 is disposed such that the top of the large-format display 21 protrudes above the rear face case 11a, and a second display screen 23 is disposed on a face of that protruding portion that is opposite to the first display screen 22. A touch panel 23a may be disposed as an operation input portion on the second display screen 23. In the above example, the first display screen 22 and the second display screen 23 of the large-format display 21 are provided as a single body, but they may also be separate.

Figure 2A:
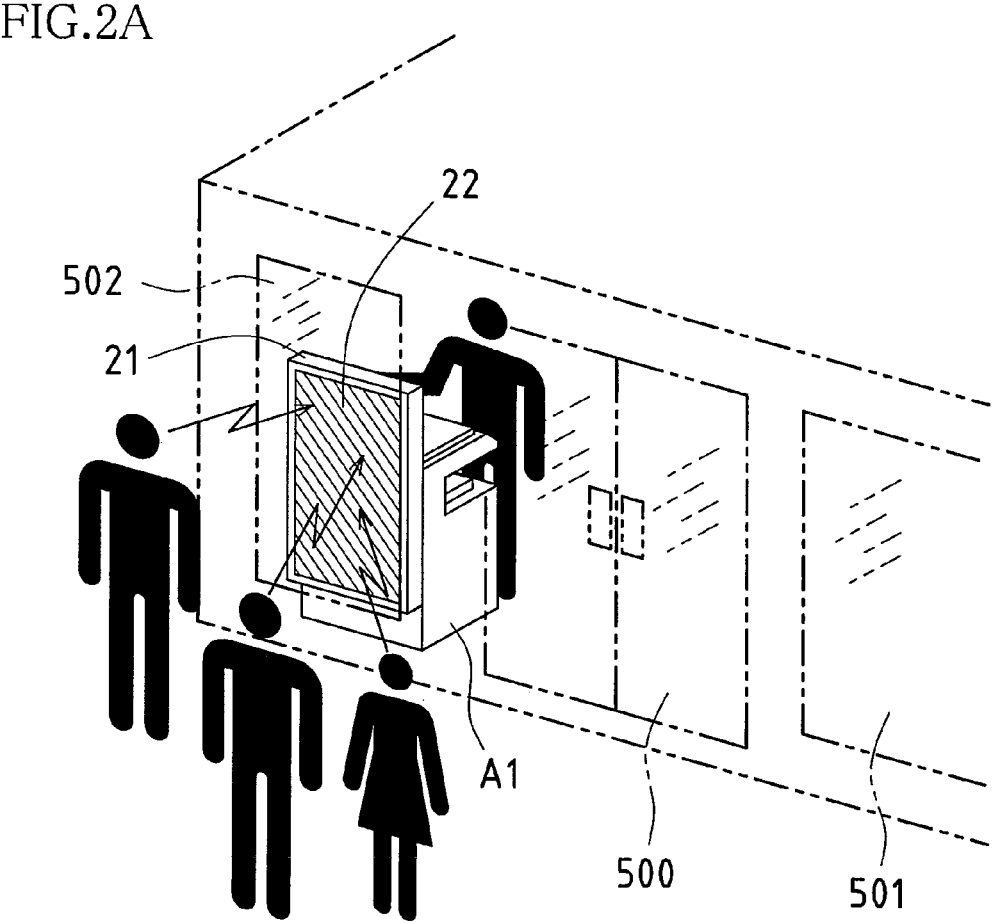
FIG. 2A is a perspective view showing an example in which the display-integrated image forming apparatus of the present invention is installed in a convenience store.
Figure 2B:
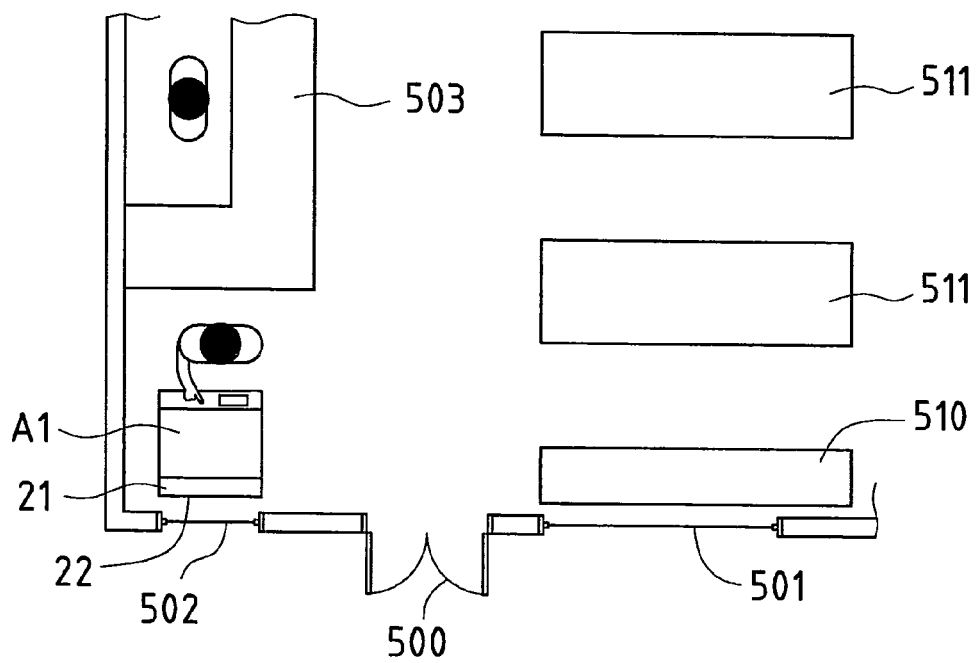
FIG. 2B is a plan view showing an example in which the display-integrated image forming apparatus of the present invention is installed in a convenience store.

FIGS. 2A and 2B show an example in which the display-integrated image forming apparatus having the above configuration is installed in a convenience store, with FIG. 2A being a perspective view and FIG. 2B being a plan view.

That is, in recent convenience stores, the portion of the store that faces the street (walkway) is entirely encased in glass by a transparent glass window, and products are displayed such that people walking along the walkway can know the state of products inside the store at a glance. Specifically, in an ordinary arrangement pattern, a wide space-side glass window 501 and a narrow space side glass window 502 are provided with an entrance 500 between them, a bookshelf 510 is placed along the wide space-side glass window 501, an image forming apparatus A is placed along the narrow space-side glass window 502, a register counter 503 is disposed behind the image forming apparatus A1 within the store, and miscellaneous products shelves 511 are disposed behind the bookshelf 510 within the store. In this case, the image forming apparatus A1 is disposed so that the first display screen 22 of the large-format display 21 attached to the rear face faces outside (i.e., the walkway outside of the store). Thus, the first display screen 22 of the large-format display 21 faces pedestrians outside of the store through the street-side (i.e., the walkway-side) glass window 502. Accordingly, by displaying advertising information on the first display screen 22 of the large-format display 21, it is possible to display publicity advertisements with impact to pedestrians outside of the store.

Figure 3A:
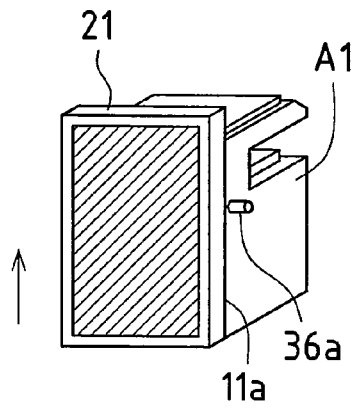
FIGS. 3A to 3C illustrate operation when the large-format display of this embodiment is slidingly moved in the vertical direction relative to a rear face case of the image forming apparatus.
Figure 3B:
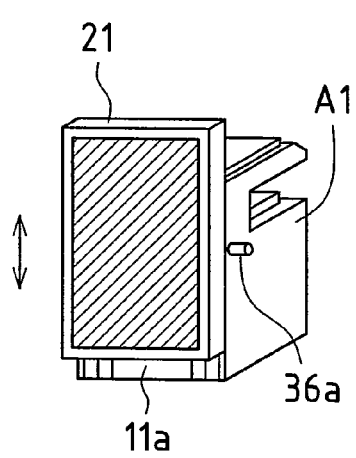
Figure 3C:
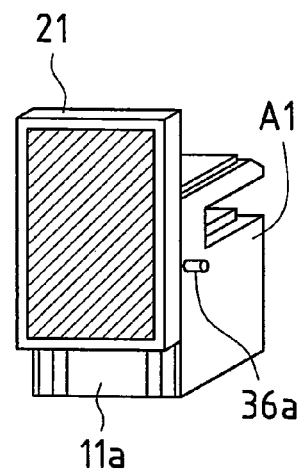
Figure 3D:
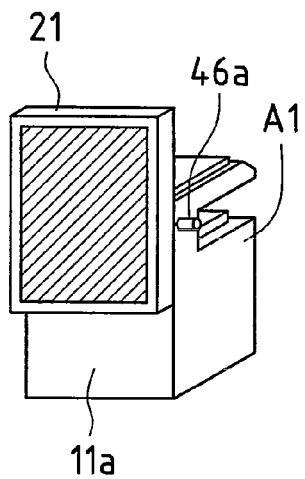
FIGS. 3D to 3F illustrate operation when the large-format display is rotated ±90 degrees along the rear face case of the image forming apparatus.
Figure 3E:
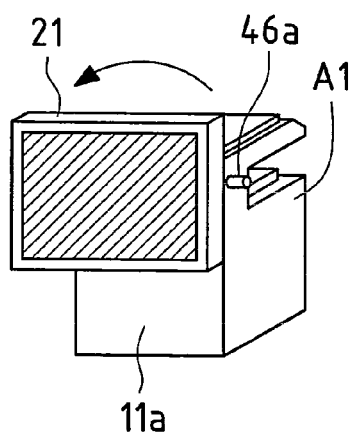
Figure 3F:
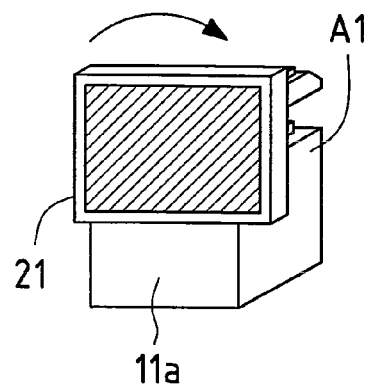

FIGS. 3A to 3C illustrate operation when the large-format display 21 of this embodiment is slidingly moved in the vertical direction relative to the rear face case 11a of the image forming apparatus A1, and FIGS. 3D to 3F illustrate operation when the large-format display 21 is rotated ±90 degrees along the rear face case 11a of the image forming apparatus A1.

Depending on the store in which the image forming apparatus A1 is installed, the bottom portion of the glass window 502 may be hidden from view, or other paper advertisements or the like may be posted. Therefore, by making it possible to adjust height and possible to fix the height position as shown in FIGS. 3A to 3C, it is possible to install the large-format display 21 at an optimal height for each store. Likewise, depending on the store in which the image forming apparatus A1 is installed, it may be desired to install the large-format display 21 in a horizontal orientation instead of a vertical orientation. Accordingly, as shown in FIGS. 3D to 3F, by making the large-format display 21 rotatable along the case 11a of the image forming apparatus A1 and able to have its position fixed at a predetermined angle (90 degrees in this example), it is possible to adopt various modes of installation according to store circumstances.

<Display Vertical Movement Mechanism Portion>

Figure 4:
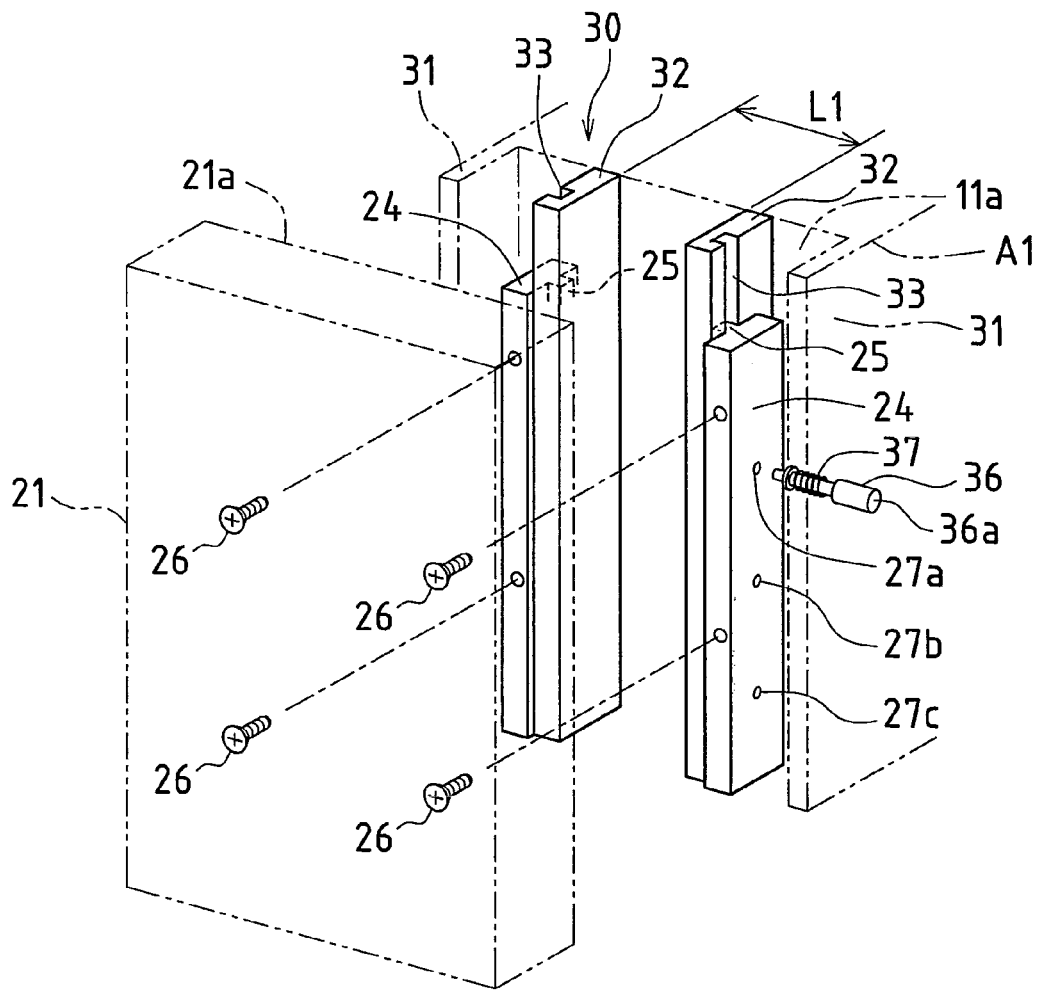
FIG. 4 is an exploded perspective view of a vertical movement mechanism portion.
Figure 5:
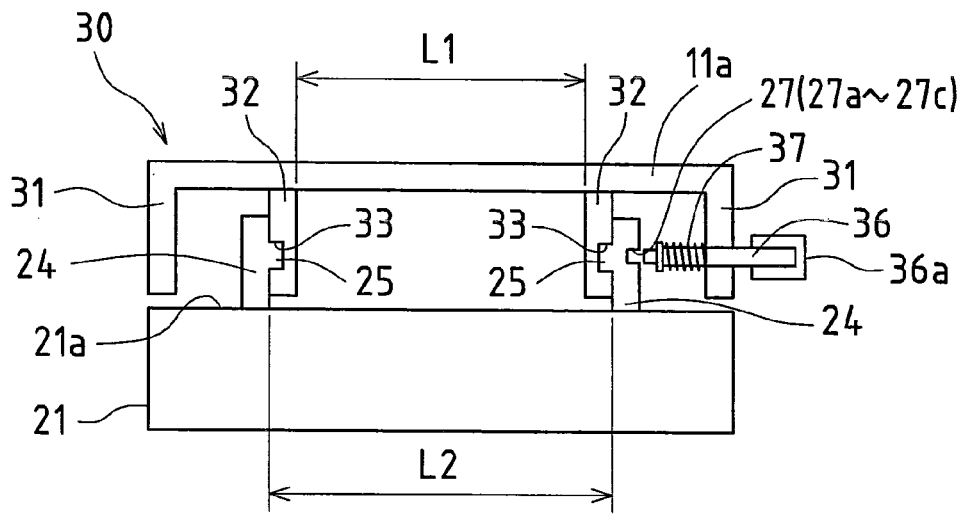
FIG. 5 is a cross-sectional view in which the vertical movement mechanism portion is viewed from above.

Next, an example of the structure of a display vertical movement mechanism portion for allowing vertical sliding movement as shown in FIGS. 3A to 3C will be described with reference to FIGS. 4 and 5. FIG. 4 is an exploded perspective view of a vertical movement mechanism portion 30, and FIG. 5 is a cross-sectional view in which the vertical movement mechanism portion 30 is viewed from above.

On both the left and right sides of the rear face case 11a of the image forming apparatus A1, a pair of elongated holding plates 31 provided so as to protrude to the rear in parallel are integrally formed (or fixed by being attached with screws or the like), and a pair of elongated guide rail plates 32 provided so as to protrude to the rear in parallel with a predetermined gap L1, are fixed by being integrally attached with unshown screws or the like to the rear face case 11a surrounded by these holding plates 31. In each of these guide rail plates 32, a single-row rail groove portion 33 that is continuous from the top end to the bottom end of the guide rail plate 32 is formed in a face (i.e., the face facing the holding plate 31) opposite to the face where the guide rail plates 32 face each other.

On the other hand, a pair of elongated display holding sliders 24, provided so as to protrude to the front in parallel with a predetermined gap L2, are fixed by being attached with screws 26 or the like to a rear face case 21a of the large-format display 21. In each of these display holding sliders 24, a single-row rail protruding portion 25 that is continuous from the top end to the bottom end of the display holding slider 24 is formed in the face where the display holding sliders 24 face each other, and these rail protruding portions 25 fit together with each of the rail groove portions 33 of the guide rail plates 32, thus engaging so as to be capable of sliding movement in the vertical direction. In other words, the predetermined gaps L1 and L2 are set such that smooth sliding movement in the vertical direction is possible while maintaining engagement of the rail protruding portions 25 and the rail groove portions 33.

Also, a vertical movement fixing pin 36 for fixing a facing display holding slider 24 is provided in one of the holding plates (the right side holding plate in FIGS. 4 and 5) 31. This vertical movement fixing pin 36 is constantly biased in the direction of the display holding slider 24 by a coil spring 37, and by engaging the vertical movement fixing pin 36 with any one of a plurality of fixing holes 27 (in this embodiment, three fixing holes 27a, 27b, and 27c) on an outer face that faces the display holding slider 24, thus fixing the height position of the display holding slider 24, so that it is possible to adjust the height position of the large-format display 21.

Here, an operation method when, for example, changing the height position of the large-format display 21 from that shown in FIG. 3A to that shown in FIG. 3B will be described.

First, a handle portion 36a of the vertical movement fixing pin 36 provided in the holding plate 31 is pulled to elastically compress the coil spring 37, thus removing engagement of the vertical movement fixing pin 36 from the fixing hole 27a of the display holding slider 24. Thus, the display holding slider 24 becomes capable of sliding movement. Next, in a state with the handle portion 36a of the vertical movement fixing pin 36 pulled, the large-format display 21 is raised to the position in FIG. 3B, and pulling of the handle portion 36a of the vertical movement fixing pin 36 is released. When doing so, due to biasing force (elastic resilience) of the coil spring 37 provided on the vertical movement fixing pin 36, the vertical movement fixing pin 36 engages with the fixing hole 27b of the display holding slider 24, and the large-format display 21 is fixed at the position in FIG. 3B.

Note that in the above operation instructions, the handle portion 36a is continuously pulled from the time that engagement of the vertical movement fixing pin 36 is removed from the fixing hole 27a of the display holding slider 24 to the time that the vertical movement fixing pin 36 is engaged in the next fixing hole 27b, but a configuration may also be adopted in which after engagement of the vertical movement fixing pin 36 is removed from the fixing hole 27a, pulling of the handle portion 36a is released once the display holding slider 24 has been slid slightly upward. Thus, when the display holding slider 24 is slowly raised, when the tip of the vertical movement fixing pin 36 matches the next fixing hole 27b, the vertical movement fixing pin 36 is automatically engaged with the fixing hole 27b due to the biasing force (elastic resilience) of the coil spring 37.

<Display Rotation Mechanism Portion>

Figure 6:
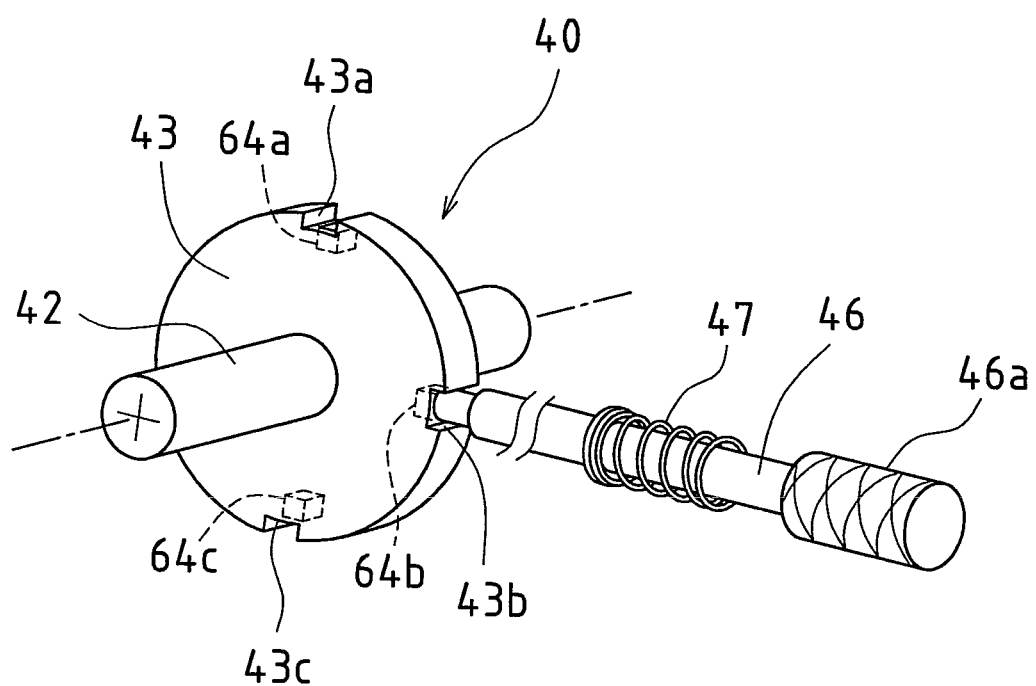
FIG. 6 is a perspective view of relevant parts of a rotational movement mechanism portion.
Figure 7:
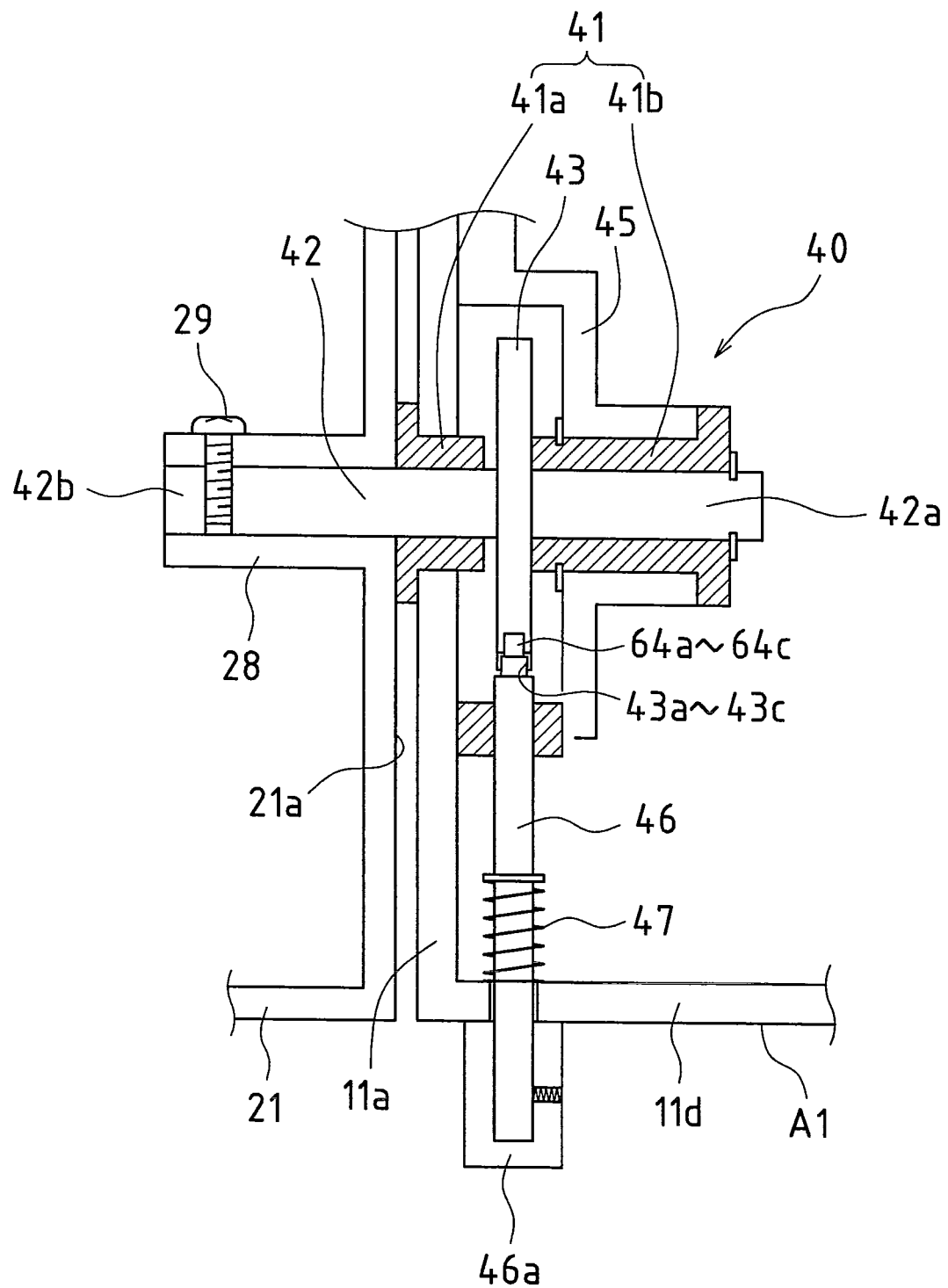
FIG. 7 is a cross-sectional view in which the rotational movement mechanism portion is viewed from above.

Next, an example of the structure of a display rotational movement mechanism portion for allowing rotational movement as shown in FIGS. 3D to 3F will be described with reference to FIGS. 6 and 7. FIG. 6 is a perspective view of relevant parts of a rotational movement mechanism portion 40, and FIG. 7 is a cross-sectional view in which the rotational movement mechanism portion 40 is viewed from above.

The large-format display 21 provided in the rear face case 11a of the image forming apparatus A1, as shown in FIGS. 3D to 3F, can be held in an orientation desired by a user by rotating the large-format display 21 clockwise ±90 degrees from a vertical display state (FIG. 3D) to a horizontal display state (FIGS. 3E and 3F).

The rotational movement mechanism portion 40 of the present embodiment for realizing this has a structure in which one end portion 42a of a rotating shaft 42 is supported by a bearing portion 41 provided in the rear face case 11a of the image forming apparatus A1, and the rear face case 21a of the large-format display 21 is supported and fixed by another end portion 42b of the rotating shaft 42. A cylindrical holding portion 28 for supporting and fixing the other end portion 42b of the rotating shaft 42 is provided in the rear face case 21a of the large-format display 21 of the present embodiment, and in a state with the other end portion 42b of the rotating shaft 42 inserted through the holding portion 28, the large-format display 21 is supported and fixed as a single body with the rotating shaft 42 by fastening with a screw 29 or the like to the rotating shaft 42 from the outer circumferential face of the holding portion 28.

On the other hand, the bearing portion 41 provided in the rear face case 11a of the image forming apparatus A1 is configured with a first bearing portion 41a supported and fixed by the rear face case 11a and a second bearing portion 41b supported and fixed by a bearing support plate 45 provided within the rear face case 11a, and the one end portion 42a of the rotating shaft 42 is supported by the first bearing portion 41a and the second bearing portion 41b. A rotating disk 43 is provided integrated with the rotating shaft 42 between the first bearing portion 41a and the second bearing portion 41b, and in the circumferential portion of the rotating disk 43, a pin groove 43a, a pin groove 43b, and a pin groove 43c are provided at 90 degree intervals.

A rotation fixing pin 46 for fixing the rotation position of the rotating shaft 42 is provided in the left side face case 11d of the image forming apparatus A1. This rotation fixing pin 46 is constantly biased in the direction of the rotating disk 43 by the coil spring 47, and by engaging the rotation fixing pin 46 in any one of the three pin grooves 43a to 43c provided in the circumferential portion of the rotating disk 43 to fix the rotation position (i.e., the rotation position of the rotating shaft 42) of the rotating disk 43, as shown in FIGS. 3D to 3F, it is possible to hold the large-format display 21 at a clockwise 0 degrees position, a clockwise 90 degrees position, or a clockwise −90 degrees position.

Here, an operation method when rotating the rotation angle position of the large-format display 21 from the clockwise 0 degrees position (the position shown in FIG. 3D) to the clockwise −90 degrees position (the position in FIG. 3E) will be described.

First, a handle portion 46a of the rotation fixing pin 46 provided in the left side face case 11d of the image forming apparatus A1 is pulled to elastically compress the coil spring 47, thus removing engagement of the rotation fixing pin 46 from the pin groove 43b of the rotating disk 43. Thus, the rotating shaft 42 becomes capable of rotational movement. Next, in a state with the handle portion 46a of the rotation fixing pin 46 pulled, the large-format display 21 is rotated clockwise −90 degrees to the position in FIG. 3E, and pulling of the handle portion 46a of the rotation fixing pin 46 is released. When doing so, due to biasing force (elastic resilience) of the coil spring 47 provided on the rotation fixing pin 46, the rotation fixing pin 46 engages with the pin groove 43c of the rotating disk 43, and the large-format display 21 is fixed at the position in FIG. 3E.

Likewise, in a state with the handle portion 46a of the rotation fixing pin 46 pulled to elastically compress the coil spring 47, thus removing engagement of the rotation fixing pin 46 from the pin groove 43b of the rotating disk 43, when the large-format display 21 is rotated clockwise +90 degrees to the position in FIG. 3F, the rotation fixing pin 46 engages with the pin groove 43a of the rotating disk 43.

Note that in the above operation instructions, the handle portion 46a is continuously pulled from the time that engagement of the rotation fixing pin 46 is removed from the pin groove 43b of the rotating disk 43 to the time that the rotation fixing pin 46 is engaged in the next pin groove 43c, but a configuration may also be adopted in which after engagement of the rotation fixing pin 46 is removed from the pin groove 43b, pulling of the handle portion 46a is released once the rotating shaft 42 has been slightly rotated in the counterclockwise direction. Thus, when the rotating shaft 42 is further rotated in the counterclockwise direction, when the tip of the rotation fixing pin 46 matches the next pin groove 43c, the rotation fixing pin 46 is automatically engaged with the pin groove 43c due to the biasing force (elastic resilience) of the coil spring 47.

Figure 8:
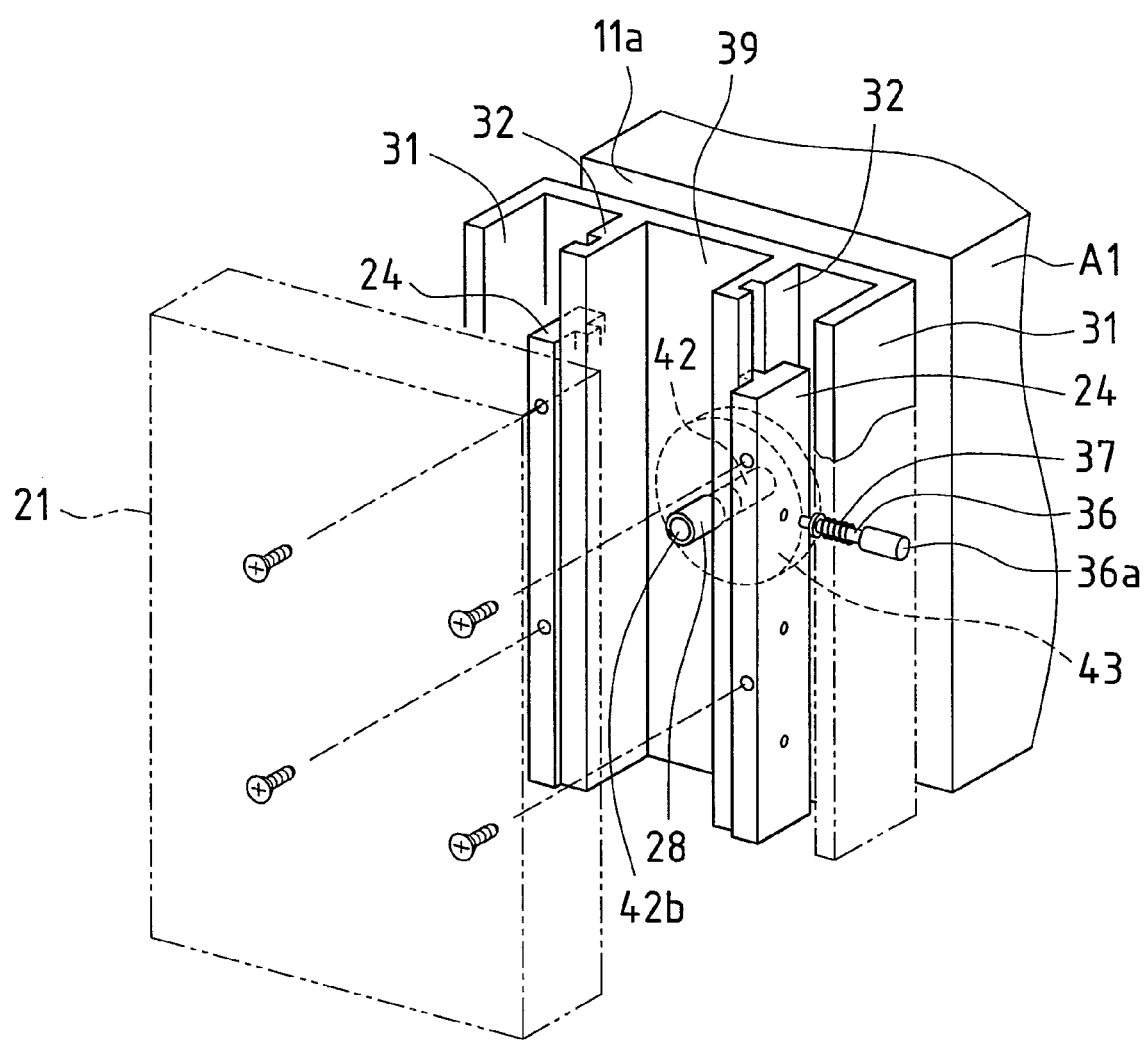
FIG. 8 is an exploded perspective view of relevant parts when the vertical movement mechanism portion and the rotation mechanism portion are provided as a single body.

In the description of the above mechanism portions, an example was described in which the display vertical movement mechanism portion 30 and the display rotation mechanism portion 40 are separately provided, but these mechanism portions may also be provided as a single body. FIG. 8 is an exploded perspective view of relevant parts when the display vertical movement mechanism portion 30 and the display rotation mechanism portion 40 are provided as a single body.

When only the display vertical movement mechanism portion 30 is provided, as shown in FIG. 4, the holding plates 31 and the guide rail plates 32 are directly fixed to the rear face case 11a of the image forming apparatus A1, but in FIG. 8, the holding plates 31 and the guide rail plates 32 are fixed to a vertical movement base plate 39, and a structure may be adopted in which this vertical movement base plate 39 is supported by and fixed to the other end portion 42b of the rotating shaft 42 shown in FIGS. 6 and 7. Thus, the vertical movement shown in FIGS. 3A to 3C can be performed together with the rotational movement shown in FIGS. 3D to 3F, so it is possible to realize a flexible arrangement configuration according to the installation conditions of each store.

Figure 9A:
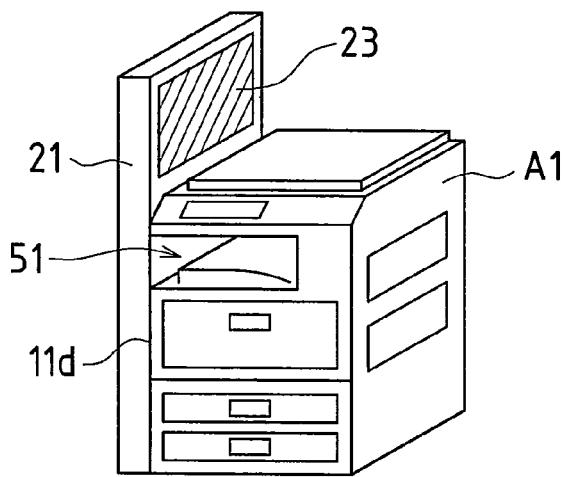
FIGS. 9A and 9B show other embodiments of the display-integrated image forming apparatus of the present invention, and are perspective views that show an example in which a large-format display has been installed to one side face case of the image forming apparatus.
Figure 9B:
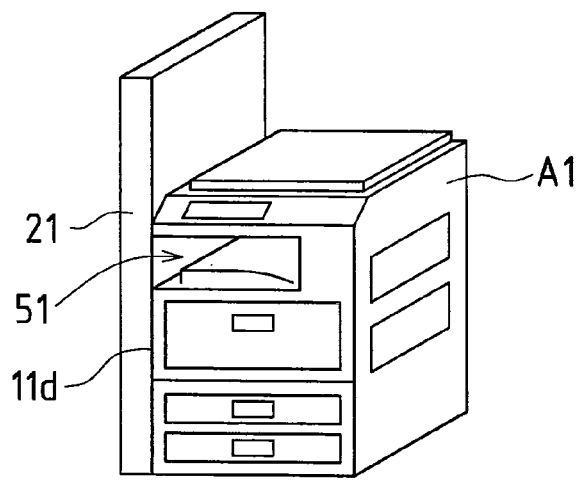

Also, in the above embodiment, an example was described in which the large-format display 21 is attached to the rear face of the image forming apparatus A1, but as long as there is no obstruction to original capturing, taking paper from a discharge tray, replenishing recording paper in a paper cassette, opening/closing doors for maintenance or the like, the large-format display 21 may, for example, be attached to the one side face case 11d of the image forming apparatus A1, as shown in FIGS. 9A and 9B. FIG. 9A shows an example with the second display screen 23, and FIG. 9B shows an example without the second display screen 23.

Figure 10:
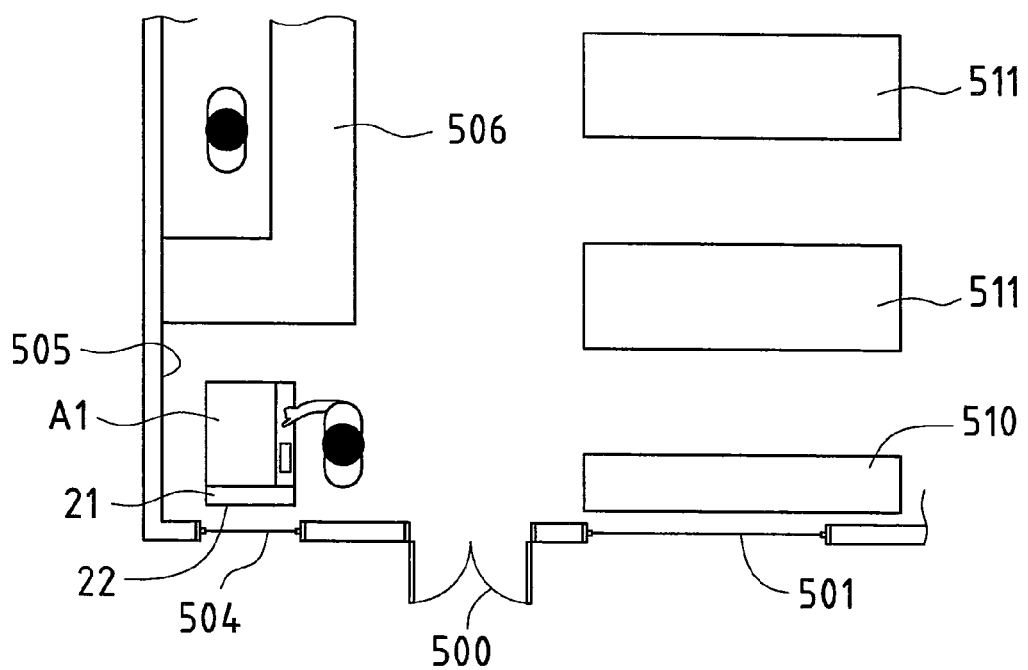
FIG. 10 is a plan view that shows an example in which a display-integrated image forming apparatus with a large-format display installed to a side face case has been installed in a convenience store.

FIG. 10 shows an example in which the image forming apparatus A1 shown in FIGS. 9A and 9B has been installed in a convenience store. In this example, the image forming apparatus A1 is installed, via the entrance 500, along a narrow space-side glass window 504, in a horizontal orientation relative to the glass window 504 such that the first display screen 22 of the large-format display 21 attached to the side face faces the outside (i.e., the walkway outside of the store). That is, the image forming apparatus A1 is installed such that the rear face of the image forming apparatus A1 faces a wall 505. This is an effective mode of installation when it is not possible to secure an adequate user operation space for the image forming apparatus A1 between the glass window 504 and a register counter 506, and this mode of installation is made possible by attaching the large-format display 21 to a side face of the image forming apparatus A1.

Figures 11A, 11B:
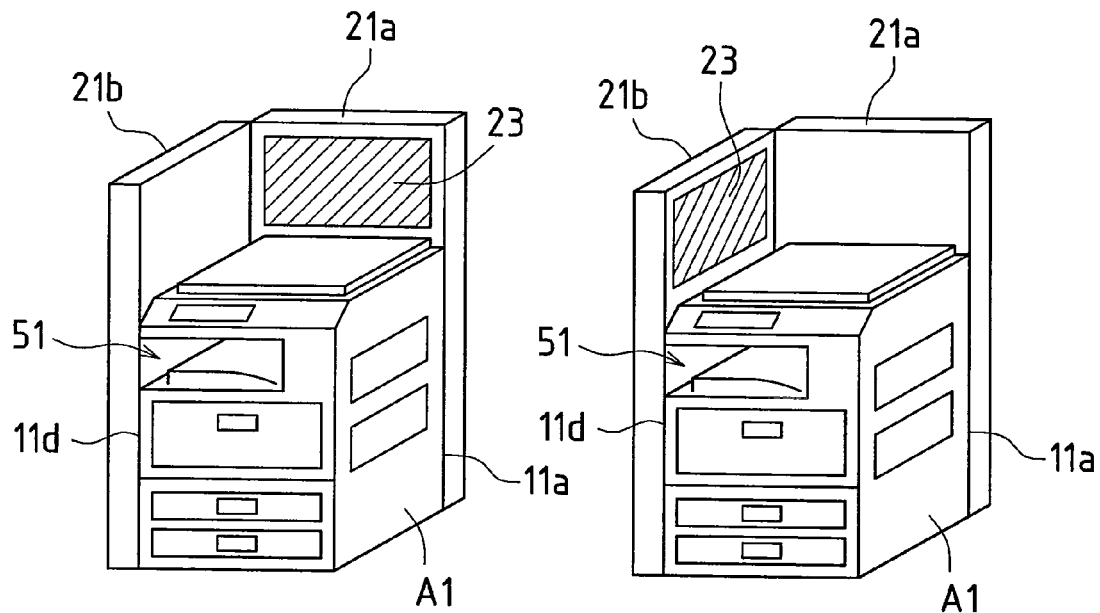
FIGS. 11A to 11D show still other embodiments of the display-integrated image forming apparatus of the present invention, and are perspective views that show an example in which a large-format display is installed to a rear face case and a side face case of the image forming apparatus.
Figures 11C, 11D:
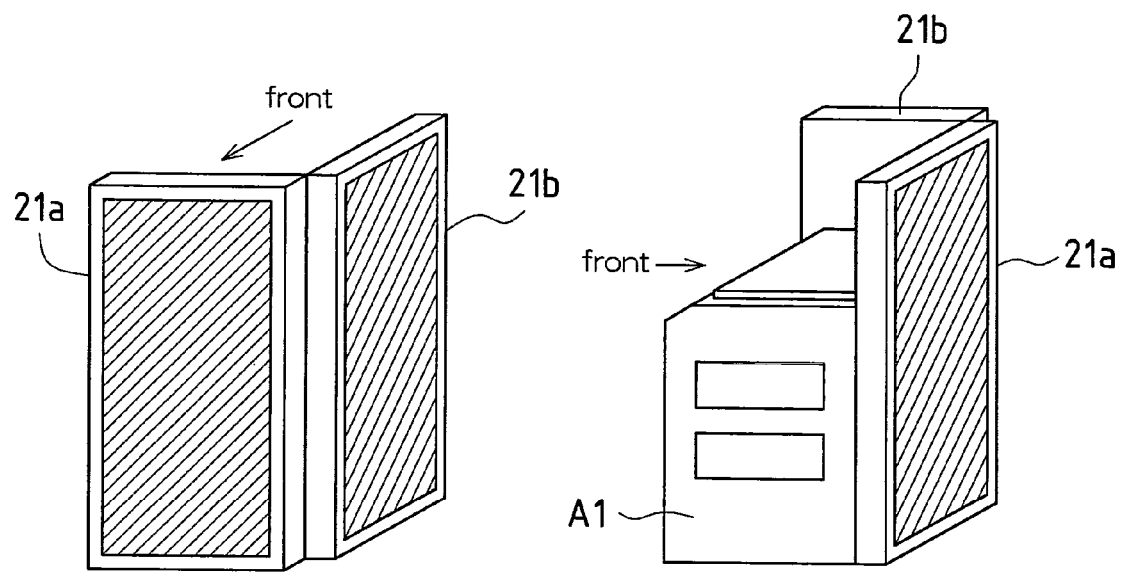

Also, in the above embodiment, an example was described in which the large-format display 21 is attached to the rear face case 11a or the side face case 11d of the image forming apparatus A1, but the large-format display 21 may, for example, be attached to the rear face case 11a and the side face case 11d of the image forming apparatus A1, as shown in FIGS. 11A to 11D. FIG. 11A shows an example in which there is a second display screen 23 in a large-format display 21a attached to the rear face case 11a, and there is not a second display screen in a large-format display 21b attached to the side face case 11d, and FIG. 11B shows an example in which there is not a second display screen 23 in the large-format display 21a attached to the rear face case 11a, and there is a second display screen in the large-format display 21b attached to the side face case 11d. Furthermore, although the second display screen 23 is provided in either the large-format display 21a or the large-format display 21b, the second display screen 23 may be provided in both the large-format display 21a and the large-format display 21b, or may be not provided in either the large-format display 21a or the large-format display 21b.

—Electrical Configuration of Display-Integrated Image Forming Apparatus of Present Invention—

Figure 12:
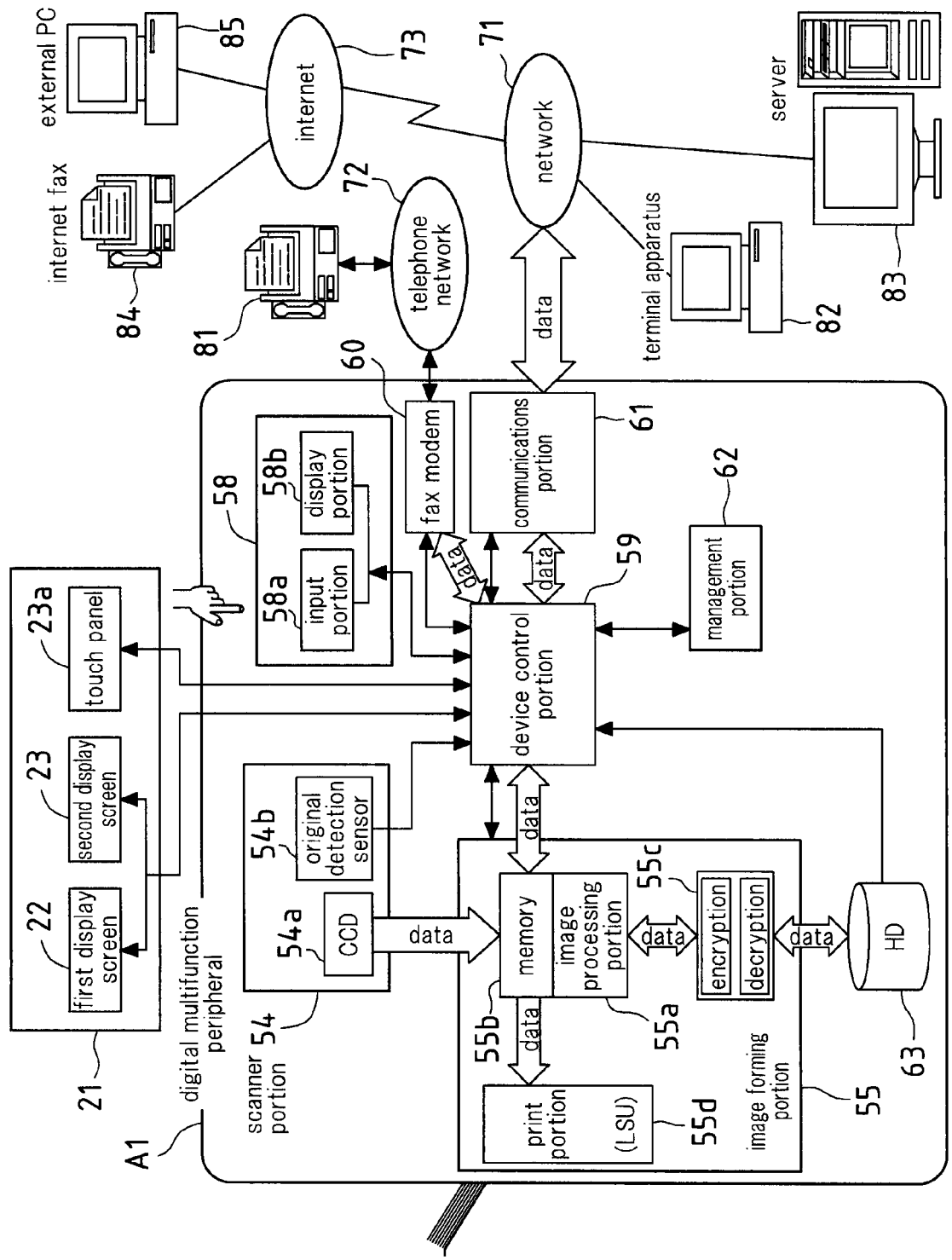
FIG. 12 is a block diagram that shows the electrical configuration of the display-integrated image forming apparatus of the present invention.

In the present embodiment, the display-integrated image forming apparatus of the present invention is applied to a digital multifunction peripheral. FIG. 12 shows an overview of the electrical configuration of such a digital multifunction peripheral, and the connection relationships with peripheral devices.

First will be a description of the electrical configuration of this digital multifunction peripheral (image forming apparatus) A1.

As shown in FIG. 12, the digital multifunction peripheral A1 is provided with a scanner portion 54, an operation portion 58, an image forming portion 55, a device control portion 59, a fax modem 60, a communications portion 61, a management portion 62, and a hard disk (HD) 63. That is, the digital copier A1 of this embodiment is a multifunction peripheral having a fax machine and a network printer.

The scanner portion 54 is provided with a CCD 54a, an original detection sensor 54b, and the like.

Figure 13:
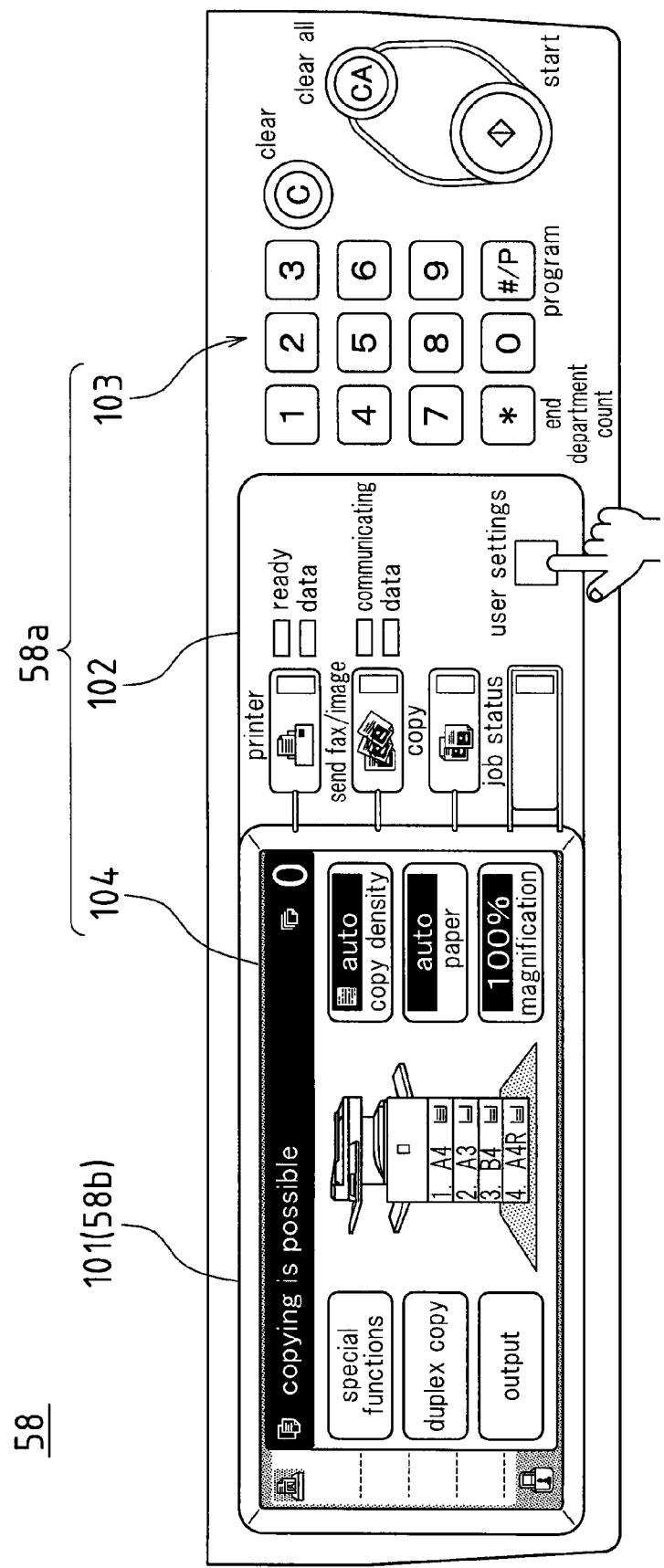
FIG. 13 illustrates the configuration of an operation portion.

The operation portion 58 is provided with an input portion 58a configured with a touch panel described later and various function buttons that are mechanical keys, and the like, and a display portion 58b that is configured with a display panel of liquid crystal or the like. FIG. 13 shows the configuration of the operation portion 58. The display portion 58b has a structure in which a transparent touch panel 104 is disposed on the upper face of a display panel 101, and various function buttons 102 and a numeric keypad 103 are disposed to the side (to the right side in FIG. 13) of the display portion 58b. Further, a start button, a clear all (CA) button, and a clear (C) button are disposed to the right side of the numeric keypad 103.

The image forming portion 55 is provided with an image processing portion 55a that has a work memory 55b where print data is decompressed; an encryption/decryption portion 55c that encrypts data transmitted from outside in order to protect that data in a device, and temporarily saves (stores) that encrypted data to the hard disk 63, and also decrypts the data saved to the hard disk 63 and transfers the decrypted data to the image processing portion 55a; a print portion 55d that has a laser scanning unit (LSU); and the like. Here, the print portion 55d is not limited to a laser scanning unit (LSU), and is applicable in various forms, such as an inkjet system or a heat transfer system.

The device control portion 59 manages operational control of devices as a whole, and is configured with a CPU, a ROM, a RAM, and the like. As display control, other than display control of the display portion 58b, the device control portion 59 also performs display control of the first display screen 22 and the second display screen 23 of the large-format display 21.

The management portion 62 manages information necessary for device operation, and for example, with respect to sending and receiving, performs management of mail addresses and fax telephone numbers, and the like. Also, the management portion 62 performs overall management of information necessary for device operation such as management of location information (address information) of data temporarily saved to the hard disk 63, management of location information of data output to the printer when operating in printer mode, and the like.

Also, in the present embodiment, the management portion 62 manages the order, time, and the like for displaying various display data stored to the hard disk 63 in the first display screen 22 and the second display screen 23 of the large-format display 21.

The communications portion 61 performs bidirectional communications with a network 71, and in the present embodiment, is a printer board provided with a memory for decompressing received data into data handled by a device. Accordingly, with the communications portion 61, received data is, while decompressed in this memory, sequentially transferred to the work memory 55b.

In the digital multifunction peripheral with the above configuration, it is possible to connect a facsimile apparatus 81 via a telephone line 72 to the fax modem 60. Also, a terminal apparatus (personal computer) 82, a server 83, and the like can be connected to the communications portion 61 via the network 71, which is a LAN or the like, and an internet fax 84, an external personal computer 85, or the like can be connected to the communications portion 61 via the Internet 73. The digital multifunction peripheral A1 of the present embodiment is disposed in this sort of a network environment.

It is also possible to store data (moving images, still images, text, or the like) that has been forwarded to the digital multifunction peripheral A1 via the network 71 from the terminal apparatus 82, the server 83, or the like to the hard disk 63, and display this data on the first display screen 22 and the second display screen 23 of the large-format display 21 based on the management information stored in the management portion 62.

FIGS. 14A to 14E show an example of a setting process procedure when setting data to be displayed in the large-format display 21. This setting process procedure is described below.

Figure 14A:
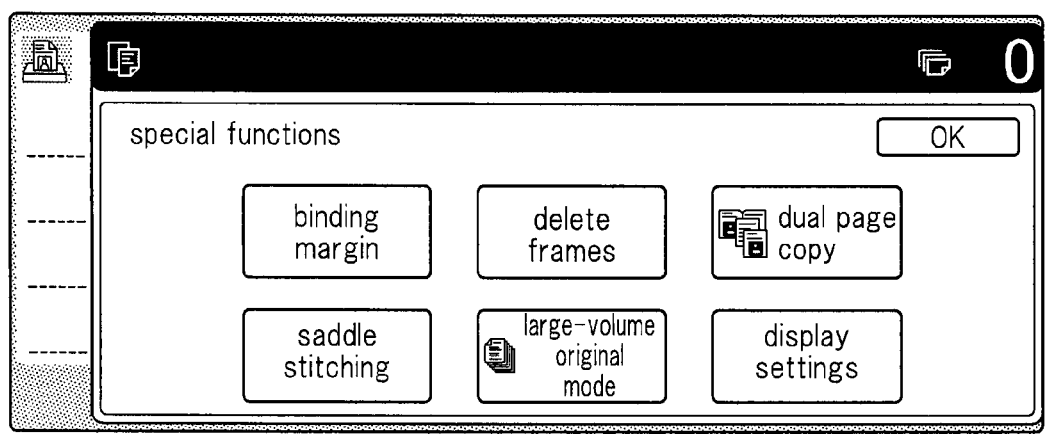
FIGS. 14A to 14E illustrate a setting process procedure when setting data to be displayed in the large-format display.

When 'special function' displayed in the display panel 101 (touch panel 104) of the operation portion 58 shown in FIG. 13 is selected, the display panel 101 moves to the screen shown in FIG. 14A.

Figure 14B:
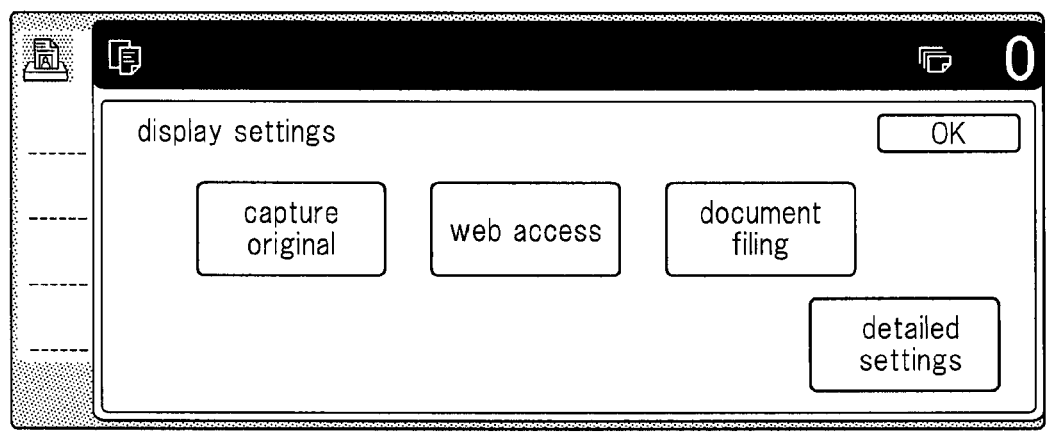

The 'special function' screen shown in FIG. 14A performs operation settings of the digital multifunction peripheral A1, and by selecting 'display settings' on this screen, the display panel 101 moves to the screen shown in FIG. 14B.

The 'display settings' screen shown in FIG. 14B is a selection screen of display data to be displayed in the large-format display 21, and is configured with 'original capture', 'web access', and 'document filing'.

'Original capture' is selected when capturing display data displayed in the large-format display 21 using the scanner portion 54.

Figure 14C:
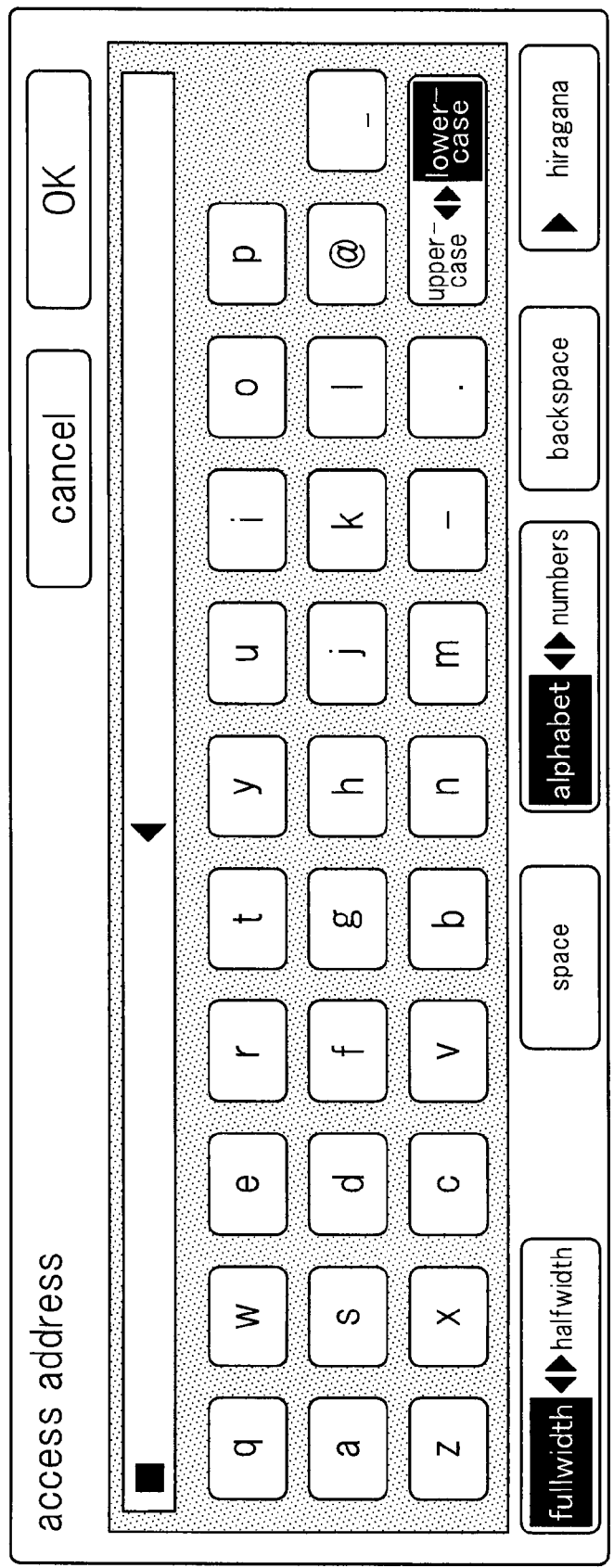

'Web access' displays a designated web page in the large-format display 21, and by selecting 'web access', the display panel 101 moves to the screen shown in FIG. 14C. Using character keys or the like displayed in FIG. 14C, it is possible to set the address of a specific home page.

Figures 14D, 14E:
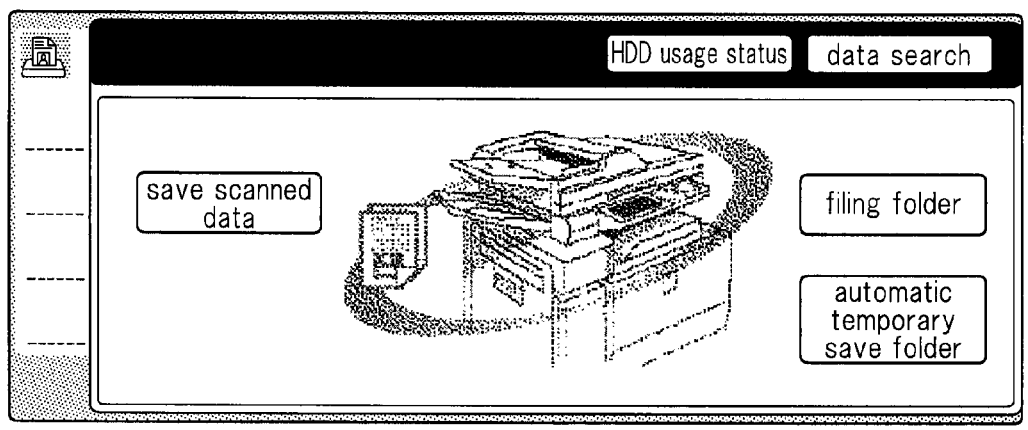

'Document filing' is used when displaying data (image data) stored to the hard disk 63 in the large-format display 21 based on the management information stored in an unshown memory portion of the management portion 62, and by selecting 'document filing', the display panel 101 moves to the 'document filing' screen shown in FIG. 14D.

The 'document filing' screen shown in FIG. 14D is configured with 'save scan', 'filing folder', and 'automatic temporary save folder'. FIG. 14E is an example display screen displayed when 'automatic temporary save folder' of this 'document filing' screen has been selected, and by selecting a desired file from a displayed file list, it is possible to select data to be displayed in the large-format display 21. In this case, it is also possible to select a plurality of files, and when a plurality of files are selected, the display data of the selected files is, for example, displayed by successively switching at a predetermined time interval (or a time interval set by the user).

The 'detailed settings' provided in FIG. 14B is used when displaying a plurality of screens in the large-format display 21 or setting display time, for example. By performing these detailed settings, it is possible, for example, to perform settings to display data A in the first display screen 22 and display data B in the second display screen, or settings to set the display time of the data A displayed in the first display screen 22 to a time from 2:00 P.M. to 5:00 P.M.

Data acquired by operation of the selection screens 'original capture', 'web access', and 'document filing' is temporarily stored (saved) to the hard disk 63, and based on the management information stored in an unshown memory portion of the management portion 62, the device control portion 59 appropriately reads this data from the hard disk 63 and displays the read data in each display screen of the large-format display 21.

Next is a description of an example of a case where, in the display-integrated image forming apparatus with the above configuration, a customer who has viewed various data displayed in the large-format display 21, performs print output of desired data with the image forming apparatus A1.

Figure 15:
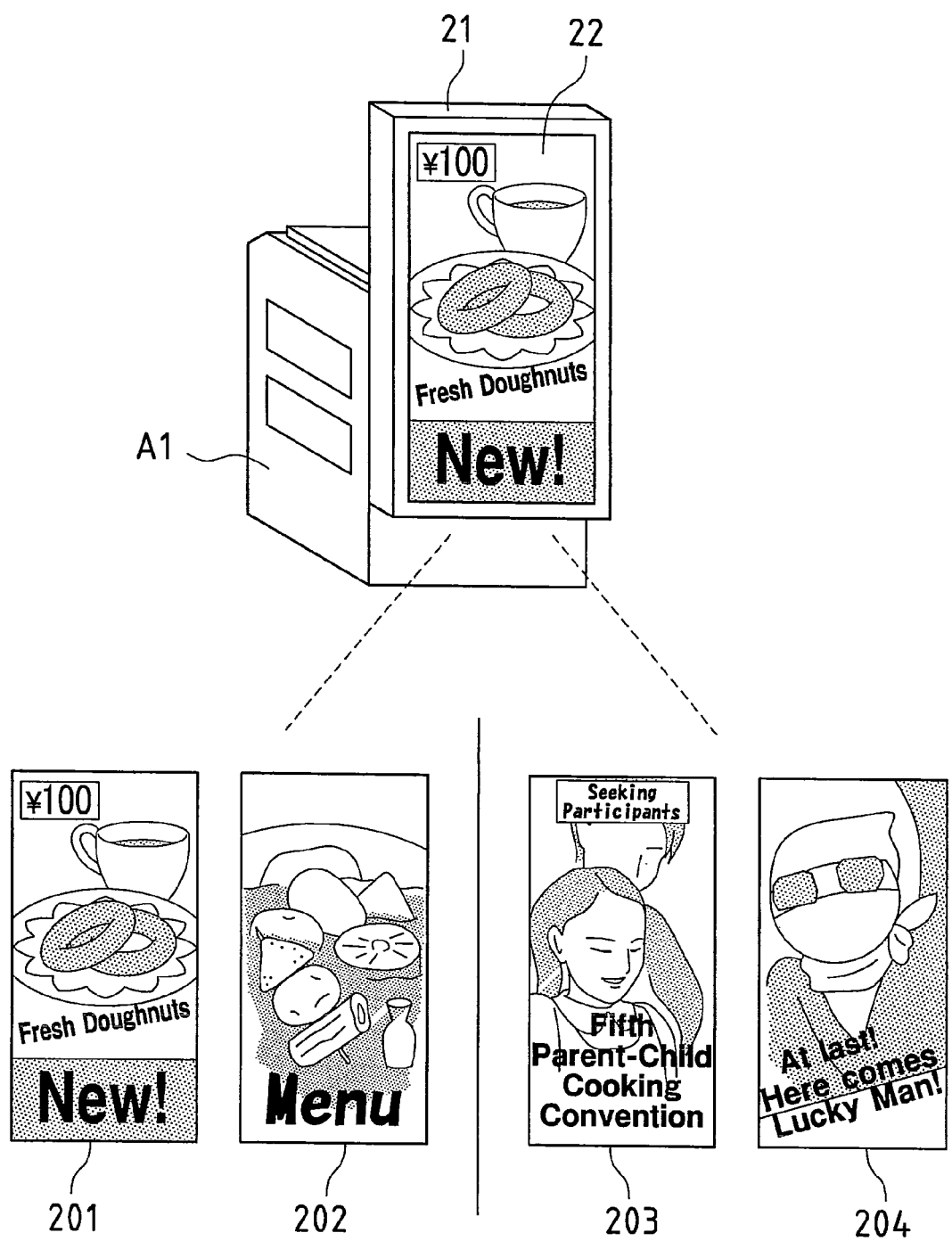
FIG. 15 illustrates a display example of advertising data displayed in a first display screen of the large-format display.

FIG. 15 is a display example of advertising data for a convenience store, a supermarket, or the like displayed in the first display screen 22 of the large-format display 21. In this display example, references 201 and 202 indicate product introduction advertising data focusing on food, a menu, a new product, or the like, for example, and references 203 and 204 indicate event introduction advertising data that introduces a function, an event, or the like, for example. By displaying this sort of advertising in the large-format display 21 disposed near the walkway-side glass window, it is possible to perform a publicity advertisement with impact to pedestrians.

Figure 16:
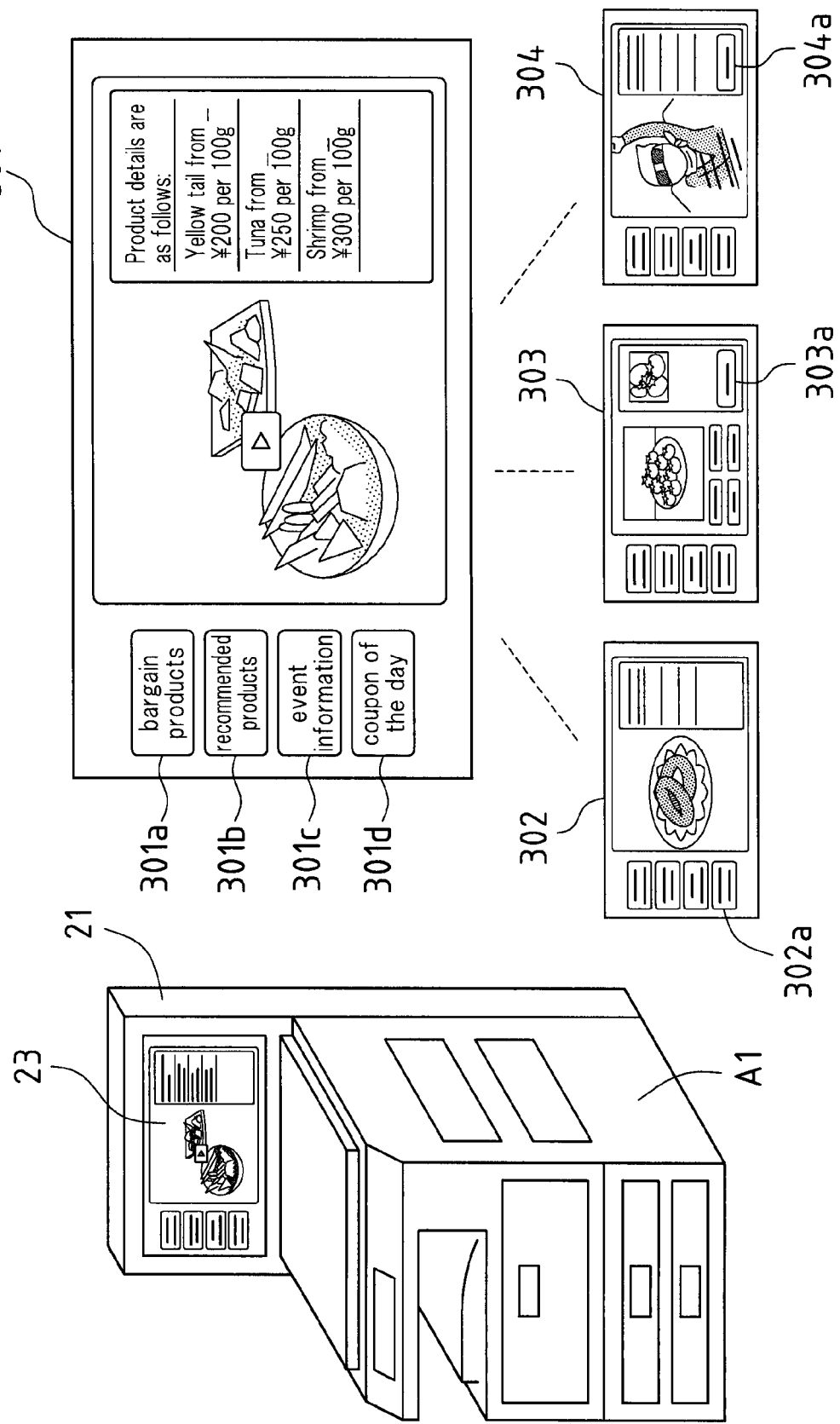
FIG. 16 illustrates a display example of data displayed in a second display screen of the large-format display.

Here, for example, the food advertising data indicated by reference 202 in FIG. 15 is displayed in the first display screen 22 of the large-format display 21, a pedestrian who has viewed this advertising data enters the store in order to obtain data related to that food, and when coming in front of the image forming apparatus A1, for example, as related information, a food information top page indicated by reference 301 in FIG. 16 is displayed in the second display screen 23 of the large-format display 21. As described above, an operation input touch panel is provided in this display screen, and when a customer (operator) that viewed this screen, for example, touches 'bargain products' 301*a*, bargain information indicated by reference 302 is displayed in the second display screen 23. Here, when the operator touches 'coupon of the day' 302*a* of this bargain information screen, although not shown, a screen for confirming whether or not to print is displayed, and when the user then touches 'print' in that screen, the device control portion 59 receives this instruction, reads data of a bargain product of the day and coupon data that is saved to the hard disk 63, and performs print output of those pieces of data via the image processing portion 55*a* and the print portion 55*d*. That is, a coupon is issued.

Also, when the operator that viewed the screen 301 of the food information top page, for example, touches 'recommended product' 301*b*, recommended product information indicated by reference 303 is displayed in the second display screen 23. Here, when the operator touches 'print' 303*a* of this recommended product information screen 303, the device control portion 59 receives this instruction, reads description data of a recommended product and recipe data that uses that recommended product that is saved in the memory portion, and performs print output of those pieces of data via the image processing portion 55*a* and the print portion 55*d*.

Also, when the user that viewed the screen 301 of the food information top page, for example, touches 'event information' 301*c*, event information indicated by reference 304 is displayed in the second display screen 23. Here, when the operator touches 'print' 304*a* of this event information screen 304, the device control portion 59 receives this instruction, reads description data of a time-limited service or present month event information and data of tickets for participating in those events saved to the hard disk 63, and performs print output of those pieces of data via the image processing portion 55*a* and the print portion 55*d*. That is, a ticket is issued.

Also, when the operator that viewed the screen 301 of the food information top page, for example, touches 'coupon of the day' 301*d*, although not shown, a list of issuable coupons is displayed, and when the operator touches a desired coupon from that list and then touches an unshown 'print', the device control portion 59 receives this instruction, reads data of that coupon saved to the hard disk 63, and performs print output of that data via the image processing portion 55*a* and the print portion 55*d*. That is, a coupon is issued.

Also, with respect to the recording paper when print output of various data displayed in the large-format display 21 is performed with the image forming apparatus A1, different recording paper may be used than when providing a copy service for a fee. That is, print output of data displayed in the large-format display 21 is provided as a service for the purpose of securing store customers, so it is necessary to have consumers use this service without concern as a free service. In other words, it is assumed that this service is provided free of charge. Consequently, when performing print output of data displayed in the large-format display 21, by using recording paper with advertising printed on the back, it is possible to have the advertiser bear the burden of the cost of printing, and thus have consumers print data without concern as a free service.

Next is a description of a process procedure when a store manager, for example, plans a sudden time-limited service, creates an advertising flyer, and displays this flyer in the large-format display 21.

In the process procedure in this case, first the created advertising flyer is placed in the original capturing portion 53 and covered by the original processing lid 52, then the 'special function' displayed in the display panel 101 of the operation portion 58 shown in FIG. 13 is selected as described above, next 'display settings' is selected from the 'special function' screen shown in FIG. 14A, then 'capture original' is selected from the 'display settings' screen shown in FIG. 14B, and finally the start button of the operation portion 58 shown in FIG. 13 is pressed. Thus, the placed advertising flyer is captured with the scanner portion 54. The captured data is temporarily saved to the hard disk 63, and displayed in the first display screen 22 of the large-format display 21. At this time, the captured data may also be displayed in the second display screen 23. Thus, it is possible to notify pedestrians outside of the store of suddenly providing a time-limited service with a publicity advertisement using a large screen, and it is also possible to notify customers inside the store of the time-limited service.

Figure 17:
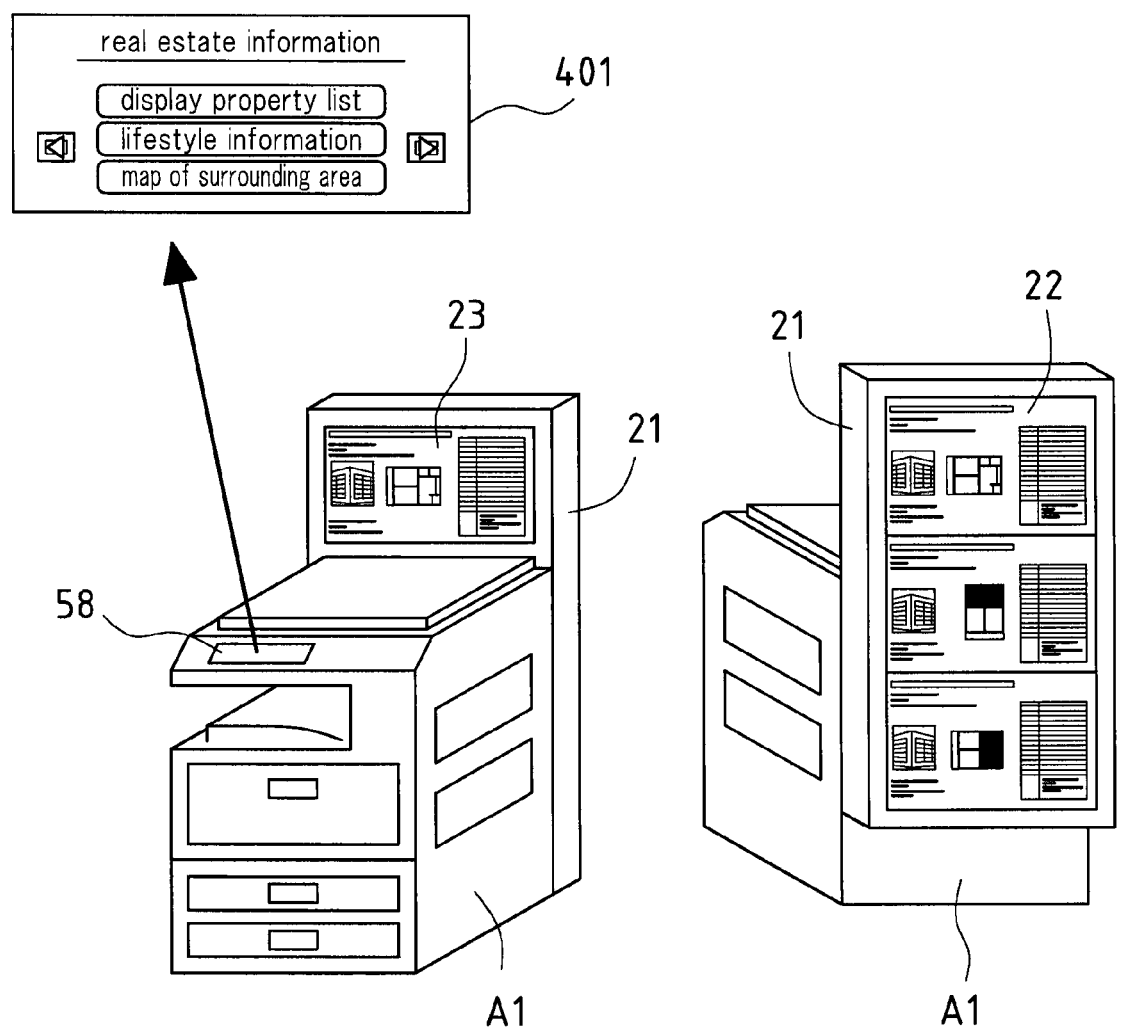
FIG. 17 illustrates a display example of data displayed in the first display screen and the second display screen of the large-format display.
Figure 18:
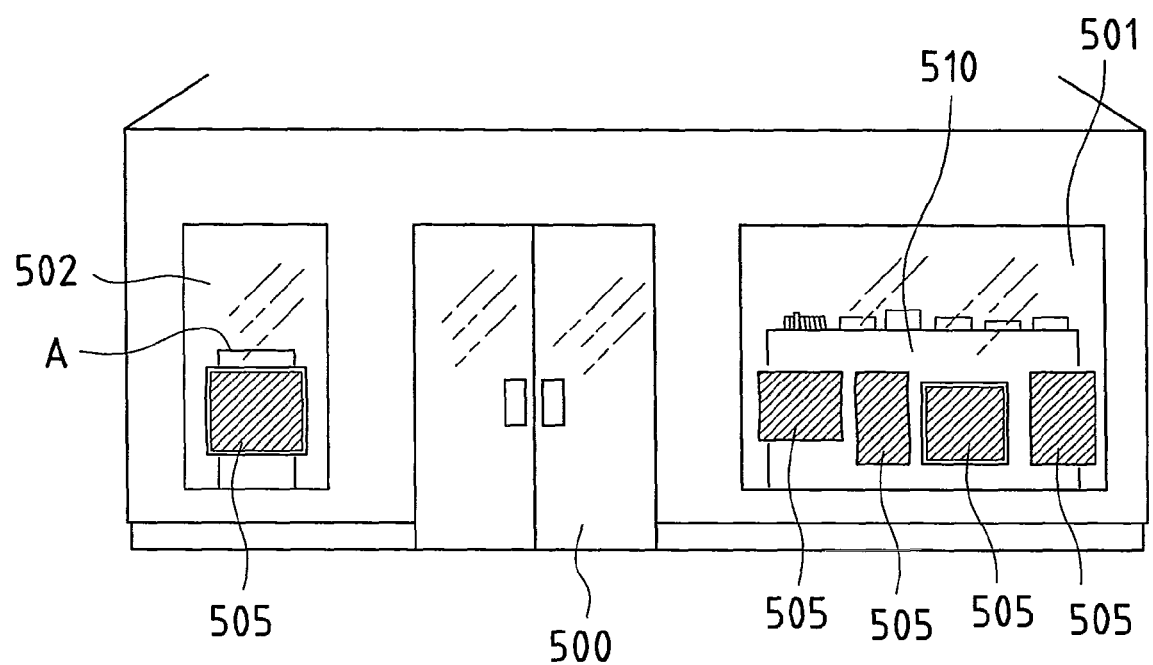
FIG. 18 illustrates an ordinary arrangement configuration of a convenience store.

The above example is concerned with a convenience store, a supermarket, or the like, but FIG. 17 shows an example of applying the display-integrated image forming apparatus of the present invention in a real estate company.

In real estate companies as well, recently a technique is adopted in which a side of the store facing a walkway is entirely encased in glass, and advertisements are posted on this glass face. Accordingly, by disposing the first display screen 22 of the large-format display 21 of the display-integrated image forming apparatus of the present invention near the glass face, same as with the above convenience store or the like, it is possible to perform publicity advertisement of real estate information. That is, as shown in FIG. 17, information of a plurality of properties is displayed. A pedestrian who has viewed this property information enters the store in order to obtain data related to that property, and when coming in front of the image forming apparatus A1, a property information top page indicated by reference 401 in FIG. 17 is displayed in the display panel 101 (touch panel 104) of the operation portion 58, and the customer (operator) that viewed this screen selects 'property list display' to select that property information. A configuration may be adopted in which, for example, simple consecutive numbers or the like are assigned to the property information displayed in the first display screen 22, so that when this selection is made from the property list, it is possible to select the property using its assigned number. Thus, the selected property information is displayed on the second display screen 23, and due to the operator who has confirmed that content pressing the start button of the operation portion 58, the device control portion 59 reads data of that property information saved to the hard disk 63, and performs print output of that property information data via the image processing portion 55*a* and the print portion 55*d*.

Note that in the display-integrated image forming apparatus of the present embodiment, as described above, the large-format display 21 is provided so as to be rotatable along the image forming apparatus case 11 of the image forming apparatus A1. Accordingly, it is necessary that the device control portion 59 switches the display direction of the first and second display screens 22 and 23 according to the rotation angle of the large-format display 21. Therefore, in the present embodiment, a rotation angle detection means 64 is disposed in the rotating disk 43 of the display rotation mechanism portion 40. As for the means of detecting the rotation direction and rotation angle of the rotating disk 43, there have been various proposals in the conventional technology, and that widely known technology is also applicable in this embodiment. However, as the simplest configuration, a configuration may be adopted in which limit switches 64*a*, 64*b*, and 64*c* (see FIGS. 6 and 7) are disposed at the bottom of the respective pin grooves 43*a*, 43*b*, and 43*c*, and when the tip of the rotation fixing pin 46 has engaged with any of the pin grooves, the corresponding limit switch is switched on. By inputting on/off signals of these limit switches 64a, 64b, and 64c to the device control portion 59, the device control portion 59 knows the rotation direction and rotation angle position of the large-format display 21, so based on these signals it is possible for the device control portion 59 to switch the display direction of the first and second display screens 22 and 23 of the large-format display 21. By doing so, it is possible to adopt various modes of installation according to store circumstances.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A display-integrated image forming apparatus comprising an original capturing portion, a print portion, an operation portion, a management portion that manages various provided information, and a control portion that controls the original capturing portion, the print portion, the operation portion, and the management portion;
   a display apparatus being disposed, the display apparatus having on one surface thereof a large screen as a first display screen, and an opposite surface opposite to the first display screen being disposed along a side face of an image forming apparatus case other than a front face of the image forming apparatus case having the operation portion such that the first display screen and the opposite surface are arranged back-to back;
   the display apparatus being disposed such that at least a portion of the display apparatus covers the side face of the image forming apparatus case, and a top of the opposite surface protrudes above the side face of the image forming apparatus case, and a second display screen being disposed on the protruding portion that is opposite to the first display screen; and
   the control portion displaying various provided information managed by the management portion on the first display screen,
   wherein the image forming apparatus includes a movement mechanism that at least rotates or slides the first display screen simultaneously with the second display screen of the display apparatus with respect to the side face while constantly maintaining the opposite surface to extend parallel to the side face and constantly maintaining at least a part of the opposite surface to directly oppose the side surface, while exposing at least a portion of the second display screen from the image forming apparatus case.

2. The display-integrated image foaming apparatus according to claim 1, wherein when desired information is selected via the operation portion from information displayed in the first display screen, the control portion performs print output of that selected information with the print portion.

3. The display-integrated image forming apparatus according to claim 1, wherein the control portion displays image information of an original that has been captured with the original capturing portion on the first display screen.

4. The display-integrated image forming apparatus according to claim 1, wherein the management portion controls a communications portion for acquiring, via a communications network, provided information that is displayed in the first display screen.

5. A display integrated image forming apparatus according to claim 1, wherein a second display screen smaller than the first display screen is disposed on the protruding portion that is opposite to the first display screen.

6. The display-integrated image forming apparatus according to claim 5, wherein the second display screen is a second operation portion separate from the operation portion, and either one or both of the operation portion and the second operation portion can be operated.

7. The display-integrated image forming apparatus according to claim 6, wherein when desired information is selected via the second operation portion from information displayed in the second display screen, the control portion performs print output of that selected information with the print portion.

8. The display-integrated image forming apparatus according to claim 5, wherein the control portion displays image information of an original that has been captured with the original capturing portion on the second display screen.

9. The display-integrated image forming apparatus according to claim 5, wherein the management portion controls a communications portion for acquiring, via a communications network, provided information that is displayed in the second display screen.

10. The display-integrated image forming apparatus according to claim 5, wherein the second display screen displays a moving image or a still image.

11. A display-integrated image forming apparatus comprising an original capturing portion, a print portion, an operation portion, a management portion that manages various provided information, and a control portion that controls the original capturing portion, the print portion, the operation portion, and the management portion;
    a display apparatus being disposed, the display apparatus having on one surface thereof a large screen as a first display screen, and an opposite surface opposite to the first display screen being disposed along a side face of an image forming apparatus case other than a front face of the image forming apparatus case having the operation portion such that the first display screen and the opposite surface are arranged back-to-back;
    the display apparatus being disposed such that at least a portion of the display apparatus covers the side face of the image forming apparatus case, and that a top of the opposite surface protrudes above the side face of the image forming apparatus case, and a second display screen smaller than the first display screen being disposed on the protruding portion that is opposite to the first display screen; and
    the control portion displaying various provided information managed by the management portion on the first display screen, and displaying related information that is related to the provided information displayed in the first display screen on the second display screen,
    wherein the image forming apparatus includes a movement mechanism that at least rotates or slides the first display screen apparatus simultaneously with the second display screen of the display apparatus with respect to the side face while constantly maintaining the opposite surface to extend parallel to the side face and constantly maintaining at least a part of the opposite surface to directly oppose the side surface, while exposing at least a portion of the second display screen from the image forming apparatus case.

12. A display-integrated image forming apparatus comprising an original capturing portion, a print portion, an operation portion, a management portion that manages various provided information, and a control portion that controls the original capturing portion, the print portion, the operation portion, and the management portion;
- a display apparatus being disposed, the display apparatus having on one surface thereof a large screen as a first display screen, and an opposite surface opposite to the first display screen being disposed along a side face of an image forming apparatus case other than a front face of the image forming apparatus case having the operation portion such that the first display screen and the opposite surface are arranged back-to back;
- the display apparatus being disposed such that at least a portion of the display apparatus covers the side face of the image forming apparatus case, and that a top of the opposite surface protrudes above the side face of the image forming apparatus case, and a second display screen smaller than the first display screen being disposed on the protruding portion that is opposite to the first display screen; and
- the control portion displaying various provided information managed by the management portion on the first display screen, and displaying information on the second display screen that is not related to the provided information displayed in the first display screen,
- wherein the image forming apparatus includes a movement mechanism that at least rotates or slides the first display screen simultaneously with the second display screen of the display apparatus with respect to the side face while constantly maintaining the opposite surface to extend parallel to the side face and constantly maintaining at least a part of the opposite surface to directly oppose the side surface, while exposing at least a portion of the second display screen from the image forming apparatus case.

13. The display-integrated image forming apparatus according to any one of claims 5, 11, and 12, wherein when desired information is selected via the operation portion from information displayed in the second display screen, the control portion performs print output of that selected information with the print portion.

14. The display-integrated image forming apparatus according to claim 1 or 5, wherein the movement mechanism rotates the display apparatus with respect to the side surface, and the control portion switches the display direction of the display screen according to the rotation angle of the display apparatus.

15. The display-integrated image forming apparatus according to claim 1 or 5, wherein the first display screen displays a moving image or a still image.

* * * * *